US009294952B2

(12) United States Patent
Siomina et al.

(10) Patent No.: US 9,294,952 B2
(45) Date of Patent: Mar. 22, 2016

(54) METHOD AND APPARATUS IN A MULTI-CARRIER SYSTEM FOR CONTROLLING INTERRUPTION AND MEASUREMENT PERFORMANCE

(71) Applicant: Telefonaktiebolaget L M Ericsson (publ), Stockholm (SE)

(72) Inventors: Iana Siomina, Solna (SE); Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 211 days.

(21) Appl. No.: 14/117,788

(22) PCT Filed: Aug. 2, 2013

(86) PCT No.: PCT/SE2013/050948
§ 371 (c)(1),
(2) Date: Nov. 14, 2013

(87) PCT Pub. No.: WO2014/025302
PCT Pub. Date: Feb. 13, 2014

(65) Prior Publication Data
US 2015/0230112 A1    Aug. 13, 2015

Related U.S. Application Data

(60) Provisional application No. 61/680,509, filed on Aug. 7, 2012.

(51) Int. Cl.
*G06F 11/00* (2006.01)
*H04J 1/16* (2006.01)
(Continued)

(52) U.S. Cl.
CPC .............. *H04W 24/10* (2013.01); *G01S 5/0205* (2013.01); *H04L 5/001* (2013.01);
(Continued)

(58) Field of Classification Search
CPC ................... H04W 52/0229; H04W 52/0254; H04W 72/0413; H04W 72/0453
USPC .......................................... 370/331, 252, 329
See application file for complete search history.

(56) References Cited

U.S. PATENT DOCUMENTS 9,014,039 B2 * 4/2015 Jeong ................ H04W 36/0094
370/252
2013/0279356 A1* 10/2013 Park ...................... H04W 24/02
370/252

FOREIGN PATENT DOCUMENTS

| WO | 2011020008 A2 | 2/2011 |
| WO | 2011099910 A1 | 8/2011 |
| WO | 2011102769 A1 | 8/2011 |

OTHER PUBLICATIONS
U.S. Appl. No. 61/637,795, filed Apr. 24, 2012.*
(Continued)

*Primary Examiner* — Chuong T Ho
(74) *Attorney, Agent, or Firm* — Murphy, Bilak & Homiller, PLLC

(57) ABSTRACT

This disclosure provides example illustrations of device-side and network-side methods and apparatuses for avoiding more than a permitted level of interruption on a serving cell in association with the device making RRM and positioning measurements on one or more Secondary Component Carriers, SCCs, corresponding to one or more of the Secondary Cells, SCells, configured for the device according to a carrier aggregation, CA, configuration. Among the several advantages flowing from these teachings, a wireless device avoids exceeding a permitted level of interruption on a serving cell downlink or uplink by aligning the positioning and RRM measurements with respect to each other, to avoid exceeding a permitted level of interruption on the serving cell. The measurement alignment may be realized at least in part via adaptation of the corresponding measurement configurations and such adaptations may be performed by the wireless device, by a radio network node, and/or by a positioning node.

40 Claims, 7 Drawing Sheets

(51) Int. Cl.
*H04L 1/00* (2006.01)
*H04L 12/26* (2006.01)
*H04W 24/10* (2009.01)
*H04L 5/00* (2006.01)
*H04W 64/00* (2009.01)
*G01S 5/02* (2010.01)
*H04W 52/02* (2009.01)
*H04W 72/04* (2009.01)
*H04W 72/00* (2009.01)

(52) U.S. Cl.
CPC ..... *H04W 52/0229* (2013.01); *H04W 52/0254* (2013.01); *H04W 64/00* (2013.01); *H04W 72/0413* (2013.01); *H04W 72/0453* (2013.01); *H04W 72/00* (2013.01)

(56) References Cited

OTHER PUBLICATIONS

3rd Generation Partnership Project, "3GPP TS 36.133 V10.7.0 (Jun. 2012)," 3rd Generation Partnership Project; Technical Specification Group Radio Access Network; Evolved Universal Terrestrial Radio Access (E-UTRA); Requirements for support of radio resource management (Release 10). Jun. 2012. pp. 1-650.

3rd Generation Partnership Project, "3GPP TS 36.211 V10.5.0 (Jun. 2012)," 3rd Generation Partnership Project; Technical Specification Group Radio Access Network; Evolved Universal Terrestrial Radio Access (E-UTRA); Physical Channels and Modulation (Release 10). Jun. 2012. pp. 1-101.

3rd Generation Parternship Project, "3GPP TS 36.214 V10.1.0 (Mar. 2011)," 3rd Generation Partnership Project; Technical Specification Group Radio Access Network; Evolved Universal Terrestrial Radio Access (E-UTRA); Physical layer; Measurements (Release 10). Mar. 2011. pp. 1-13.

3rd Generation Partnership Project, "3GPP TS 36.331 V10.5.0 (Mar. 2012)," 3rd Generation Partnership Project; Technical Specification Group Radio Access Network; Evolved Universal Terrestrial Radio Access (E-UTRA); Radio Resource Control (RRC); Protocol specification (Release 10).

Author Unknown, "Discussion on UE interruption requirements in SCC RSTD measurements with deactivated SCell," Huawei, HiSilicon. 3GPP TSG-RAN WG4 Meeting #63AH; R4-63AH-0040. Jun. 26-28, 2012. pp. 1-7. Oulu, Finland.

Author Unknown, "Analysis of Activation/Deactivation of Secondary Cell," Ericsson, ST-Ericsson; 3GPP TS-RAN WG4 Meeting #56; R4-103210; Aug. 23-27, 2010. pp. 1-3. Madrid, Spain.

Author Unknown, "Mobility measurements in carrier aggregation," NTT DOCOMO; 3GPP TSG-RAN WG4 Ad hoc meeting #10-03; R4-102419. Jun. 28-Jul. 2, 2010. pp. 1-4. Bratislava, Slovakia.

Author Unknown, "UE behaviours in DRX for SCC measurements with deactivated SCell," NTT DOCOMO; 3GPP TSG-RAN WG4 meeting #59AH; R4-113537; Jun. 27-Jul. 1, 2011. pp. 1-3. Bucharest, Romania.

Unknown, Author, "UE interruption requirements in SCC RSTD measurements with de-activated Scell R10", 3GPP TSG-RAN4 Meeting #66, R4-130269, 36.133 CR 1598, V11.3.0, Malta, Jan. 28-Feb. 1, 2013, 1-4.

Unknown, Author, "UE interruption requirements in SCC RSTD measurements with de-activated Scell R10", 3GPP TSG-RAN4 Meeting #66, R4-130844, 36.133 CR 1597, rev. 1, V10.9.0, Malta, Jan. 28-Feb. 1, 2013, 1-4.

* cited by examiner

METHOD AND APPARATUS IN A MULTI-CARRIER SYSTEM FOR CONTROLLING INTERRUPTION AND MEASUREMENT PERFORMANCE

TECHNICAL FIELD

The teachings herein generally relate to wireless communication networks, and particularly relate to multi-carrier systems, such as where a wireless device may transmit and/or receive radio signals in a multi-carrier network.

BACKGROUND

Carrier aggregation, CA, features were introduced in Release 10 of the 3GPP standard for Long Term Evolution, LTE, and additional CA features are included in Release 11. CA is also specified for High Speed Packet Access or HSPA. According to CA, a wireless device is configured with a Primary Component Carrier, PCC, and one or more Secondary Component Carriers, SCCs. The network serves the wireless device from a Primary Cell, PCell, on the PCC, and may serve the wireless device from one or more Secondary Cells, SCells, on the one or more SCCs. Note that a configured SCell can be activated and deactivated, and, of course, the particular cell(s) that are included in the carrier aggregation configuration of the wireless device may be changed, e.g., responsive to changing signal conditions, mobility events, etc.

Activation and deactivation of SCells changes the aggregated carrier bandwidth "seen" by the wireless device. Thus, SCell activations and deactivations cause the wireless device to reconfigure its receiver bandwidth responsive to such changes. In turn, reconfiguration of the receiver may cause interruptions on at least the PCell, depending on the corresponding SCell measurement cycle, measCycleSCell, and whether Discontinuous Reception, DRX, is used or not. These interruptions degrade the system performance because they increase the chance of missed packets, e.g., missed ACK/NACK signalling. Furthermore, when the wireless device performs positioning measurements, especially on Positioning Reference Signals, PRS, which are transmitted infrequently, the impact of the interruptions on at least PCell severely degrade the positioning measurements. This degradation, in turn, reduces positioning accuracy. Reduced accuracy in this regard is particularly problematic because positioning measurements are used for a number of critical services e.g. emergency calls.

Among its several advantages, CA provides for enhanced peak-rates. For example, it is possible to use multiple 5 MHz carriers in HSPA to enhance the peak-rate within the HSPA network. Similarly in an LTE network, multiple carriers, each up to 20 MHz in bandwidth, can be aggregated in the UL and/or on DL. Each carrier in multi-carrier or carrier aggregation system is generally termed as a component carrier, CC, or sometimes is referred to as a "cell." One may assume here that the term "component carrier" or "CC" simply means an individual carrier used for carrier aggregation in a multi-carrier wireless communication network. Similarly, the terms "CA" and "carrier aggregation" may be used interchangeably with "multi-carrier system," "multi-cell operation," "multi-carrier operation," and "multi-carrier transmission" and/or "multi-carrier reception."

CA may be used for transmission of signaling and data in the uplink and downlink directions. As earlier noted, one of the CCs operates as the PCC, which may also be referred to as the "anchor carrier." Also as noted, the remaining CCs are called SCCs, or "supplementary" carriers. Generally, the PCC carries the essential device-specific signaling and it exists in both uplink and downlink directions. The network may assign different PCCs to different devices operating in the same sector or cell.

Therefore, a user equipment, UE, or other wireless device may have more than one serving cell in the downlink and/or in the uplink. For example, a given wireless device may have one primary serving cell operating on the PCC and one or more serving SCells operating on the SCC. The serving cell is interchangeably called as primary cell, PCell, or primary serving cell, PSC. The PCell and SCell(s) enable the device to receive and/or transmit data. More specifically, the PCell and SCell exist in DL and/or UL for the reception and transmission of data by the device. The remaining non-serving cells on the PCC and SCC are called neighbor cells. That is, there may be one or more neighbor cells operating on the same PCC and one or more neighbor cells operating on the same SCC.

The CCs belonging to the CA may belong to the same frequency band, which is referred to as intra-band CA. Alternatively, the CCs may belong to different frequency bands, which is referred to as inter-band CA. Further, a given CA configuration may include both intra-band and inter-band CCs, e.g., two CCs in band A and one CC in band B. Still further, an inter-band CA configuration that includes carriers distributed over two bands is called dual-band-dual-carrier-HSDPA, DB-DC-HSDPA, in HSPA networks, and is referred to simply as inter-band CA in LTE networks.

Furthermore the CCs in intra-band CA may be adjacent or non-adjacent in the frequency domain. The latter case is referred to as intra-band non-adjacent CA. A hybrid CA configuration that includes intra-band adjacent CCs, intra-band non-adjacent CCs, and inter-band CCs is also possible. Using CA between carriers of different technologies is also referred to as "multi-RAT carrier aggregation" or as "multi-RAT-multi-carrier system" or simply as "inter-RAT carrier aggregation." In one example of multi-RAT CA, carriers from WCDMA and LTE are aggregated. In another example of multi-RAT CA, carriers from LTE and CDMA2000 are aggregated. For the sake of clarity, the aggregation of carriers of the same RAT may be referred to as "intra-RAT" CA, or simply as "single RAT" CA. Unless noted otherwise, the term "CA" as used herein may refer to any such types of carrier aggregation.

The CCs included in a given CA configuration may or may not be co-located. That is, not all CCs included in a given CA configuration involve the same site, base station or other radio network node, such as a relay node, mobile relay, etc. For instance, the CCs may be transmitted or received at different locations. Examples include CA configurations that involve non co-located transmission points in the network. Examples of non co-located transmission points include geographically separated base stations, Remote Radio Heads, RRHs, and/or Remote Radio Units, RRUs. Well-known examples of such arrangements include not only the use of RRUs and/or RRHs, but also more generally the use of Distributed Antenna Systems, DAS, and Coordinated Multipoint, CoMP, transmission and/or reception arrangements.

The teachings herein apply to such arrangements and have direct applicability to CoMP systems, and it should also be noted that CA may be used in conjunction with multi-antenna transmission. For example, signals on each CC included in a CA configuration may be transmitted by a base station to a wireless device over two or more transmit antennas, or may be received by the base station from a wireless device over two or more receive antennas.

In further details, Release 11 provides for an "additional carrier type" or ACT, which may also be referred to as a "new carrier type" or NCT, where one or more SCells can operate on the ACT. An ACT or NCT is a type of SCC but the cells on an ACT may contain a reduced number of certain signals types, where the reduction is defined in the time and/or frequency domains. For example, a cell on an ACT may contain Cell-specific Reference Symbols, CRS, only in one subframe per five milliseconds. The CRS also may be reduced in the frequency domain, e.g., the CRS appear in the central 25 Resource Blocks, RBs, of the overall OFDM time/frequency grid, even if the cell bandwidth, BW, is larger than 25 RBs.

In contrast, in a "legacy" carrier, the CRS are transmitted in every subframe over the entire carrier bandwidth. Also synchronization signals in an ACT potentially have a reduced density in time, as compared to the legacy carrier, which uses five milliseconds. Further, the synchronization signals in an ACT may be transmitted according to a configurable pattern. Thus, an SCell on an ACT is therefore used for receiving data, whereas important control information is mainly sent on the PCell, which is transmitted on the PCC. The PCC is always a normal legacy carrier, i.e., it contains all common channels and signals defined in Release 8.

CA operation requires multi-carrier setup and release procedures, which enable a multi-carrier network to at least temporarily setup or release the use of an SCell in the downlink and/or uplink by a CA-capable wireless device. SCell setup and release involves two main concepts; namely the configuration and de-configuration of SCell(s), and the activation and deactivation of SCell(s).

Using the LTE context as an example, an eNodeB uses the configuration procedure to configure a CA-capable wireless device with one or more SCells, e.g., a downlink SCell, an uplink SCell, or both. On the other hand, the de-configuration procedure is used by the eNodeB to de-configure or remove one or more already configured SCells in the downlink and/or the uplink. The configuration or de-configuration procedure is also used to change the current multi-carrier configuration, such as for increasing or decreasing the number of SCells in the current CA configuration of the wireless device, or for swapping the existing SCells with new ones. The configuration and de-configuration are done by the eNodeB using Radio Resource Control, RRC, signaling.

Further, the eNodeB in LTE can activate one or more currently deactivated SCells on one or more corresponding SCCs. Conversely, the eNodeB can deactivate one or more SCells that are currently active. Thus, the SCells included in the CA configuration of a given wireless device are configured by eNodeB, which can activate and deactivate individual ones of them. The PCell is always activated, and the configured SCells are initially deactivated upon an SCell addition and after a handover of the wireless device.

SCell activation and deactivation is accomplished by sending an Activation/Deactivation Medium Access Control, MAC, control element. The Activation/Deactivation command or more specifically, "Activation/Deactivation MAC control element (CE)" is sent via the MAC layer to the wireless device. This particular MAC CE is identified by a MAC Protocol Data Unit, PDU, subheader having a fixed size and consisting of a single octet—octet 1—containing seven C-fields and one R-field, such as shown in FIG. 1. The Ci and R fields in the Activation/Deactivation MAC control element are defined as follows. For Ci, if there is an SCell configured with SCellIndex i as specified in 3GPP TS 36.331 V10.5.0 (2012-03), this field indicates the activation/deactivation status of the SCell with SCellIndex i. Otherwise, the wireless device shall ignore the Ci field. The Ci field is set to "1" to indicate that the SCell with SCellIndex i shall be activated. The Ci field is set to "0" to indicate that the SCell with SCellIndex i shall be deactivated. The R field is a reserved bit and is set to "0."

Typically, SCell deactivation is done when there is no data to transmit on the SCell(s). Deactivation enables battery savings at the wireless device. In the current standard, 3GPP TS 36.133, v10.7.0, both uplink and downlink SCells are activated and/or deactivated simultaneously upon receiving the MAC CE. In principle, however, the activation/deactivation can be done independently on uplink and downlink SCells.

As suggested earlier, glitches or interruptions on the PCell can arise with SCell setup or release, including any time an SCell is configured, de-configured, activated or de-activated. Such interruptions primarily occur in cases where the wireless device has a single radio chain to receive and/or transmit more than one CC. For example, in case of intra-band carrier aggregation, where CCs are adjacent, a wireless device may have a single radio that can be reconfigured dynamically for the aggregated BW of 40 MHz, for use of two CCs of 20 MHz BW each.

In particular, the interruptions arise when the wireless device changes its reception and/or transmission bandwidth BW from single-carrier to multiple-carrier operation or vice versa. In order to change the BW, the wireless device has to reconfigure RF components in its RF chain, such as RF filters, power amplifiers, etc. For example, consider a wireless device operating according to a CA configuration in which two downlink carriers are configured, each such carrier having a BW of 20 MHz. It will be understood that one of the CCs operates as the PCC and one of the CCs operates as an SCC. Deactivation of the secondary component carrier by the serving/primary cell causes the wireless device to reduce its transceiver BW e.g. from 40 MHz to 20 MHz. This reconfiguration may cause 5-10 milliseconds of interruption on the PCell, on the PCC. Similarly, if the SCell is configured or de-configured, then the PCell may be interrupted for 15-20 milliseconds.

The setup or release of a downlink SCell may also cause uplink interruptions, such as when the SCell and PCell, or another SCell, are Time Division Duplex, TDD, cells that may have the same or different downlink/uplink subframe configurations, or even when both the SCell and PCell, or another SCell, are Frequency Division Duplex, FDD, cells. Similarly, the setup and release of an uplink SCell may cause interruptions in the downlink, such as when the SCell and PCell, or another SCell, are TDD or FDD cells.

During such interruption periods, the wireless device cannot receive from and/or transmit any signal or information to the network. Furthermore, during such interruptions, the wireless device cannot perform measurements due to its inability to receive and/or transmit signals.

In the current standard, interruptions on the PCell arising from reconfiguration of the receiver bandwidth responsive to SCell activation status changes may be permitted, depending upon the measCycleSCell and whether DRX is used or not. For example, no interruption on the PCell is allowed when no common DRX is used and measCycleSCell<640 milliseconds, or when common DRX is used. On the other hand, interruptions on the PCell of up to 0.5% probability of missed ACK/NACK is permitted when no common DRX is used and when measCycleSCell≥640 milliseconds.

Note that the wireless device may perform measurements on deactivated SCells or other cells on the same SCC as a deactivated SCell. In such cases, the measurements are performed in measurement cycles configured by higher layers. The measurement cycles may have periodicity of 160, 256, 320, or 512 subframes. The maximum time of a measurement within each cycle is currently not restricted by the standard, but in practice it is likely to be up to six subframes in each cycle. As described above, the current standard specifies requirements for interruptions on the PCell when the wireless device performs measurements on an SCC with a deactivated SCell.

Positioning measurements are among the radio signal power, quality and timing or relative timing measurements that a wireless device makes for Radio Resource Management, RRM, and for positioning. Several positioning methods exist for determining the location of a target device, which can be a UE, mobile relay, tablet, laptop computer, PDA, etc. The well-known methods include satellite based methods, such as Assisted General Navigational Satellite System, A-GNSS, measurements. On such example is Assisted Global Positioning System, A-GPS, measurements.

Another approach used in LTE networks relies on Observed Time Difference of Arrival, OTDOA, measurements, which rely on a wireless device making Reference Signal Timing Difference, RSTD, measurements for determining its position. In another approach, a Location Measurement Unit or LMU measures Uplink Time Difference of Arrival, UTDOA, to determine the location of a wireless device. Enhanced cell ID techniques use one or more of device receive/transmit, Rx/Tx, time differences, bases station Rx-Tx time differences, LTE Pilot and/or Reference Signal Received Quality, RSRQ, HSPA CPICH measurements, angle of arrival, AoA, measurements, etc., for determining device position. Further, so called "hybrid" methods combine measurement types or techniques from more than one measurement method, for determining device position.

There are different types of positioning nodes in LTE, such as the Enhanced Serving Mobile Location Center or E-SMLC, or the SUPL Location Platform, SLP, or location server—here "SUPL" denotes "Secure User Plane Location." In LTE, a positioning node configures a wireless device, eNodeB, or LMU to perform one or more positioning measurements. The positioning measurements are used by the wireless device or the positioning node to determine the device's location. The positioning node communicates with device and eNodeB in LTE using the LTE Positioning Protocol, LPP, or the annex to that protocol, referred to as LPPa.

From a positioning network architecture perspective in LTE, the three key elements include the LCS Client, the LCS target and the LCS Server, where "LCS" denotes Location Services. The LCS Server is a physical or logical entity managing positioning for an LCS target by collecting measurements and other location information, assisting the target in measurements when necessary, and estimating the LCS target location. An LCS Client is a software and/or hardware entity that interacts with an LCS Server for the purpose of obtaining location information for one or more LCS targets, i.e., the entities being positioned. LCS Clients may also reside in the LCS targets themselves. An LCS Client sends a request to the LCS Server to obtain location information, and the LCS Server processes and serves the received requests and sends the positioning results and optionally a velocity estimate to the LCS Client. A positioning request can be originated from the target device or entity, or from a network node or external client.

Position calculations can be conducted, for example, by a positioning server, such as an E-SMLC or SLP in LTE, or may be carried out at least in part in the targeted wireless device. The former approach corresponds to the UE-assisted positioning mode, whilst the latter approach corresponds to the device-based positioning mode, which is referred to as UE-based positioning in 3GPP parlance.

The LPP is a point-to-point protocol between an LCS Server and an LCS target device, and is used for positioning the target device. LPP can be used both in the user and the control plane, and multiple LPP procedures are allowed in series and/or in parallel, thereby reducing latency. LPPa is a protocol between eNodeBs and LCS Servers, and is specified only for control-plane positioning procedures. However, LPPa can be used to assist user-plane positioning, by querying eNodeBs for information and eNodeB measurements. The SUPL protocol is used as a transport for LPP in the user plane. LPP can also be used to convey LPP extension messages inside LPP messages. For example, OMA LPP extensions, LPPe, are being specified to allow for operator-specific assistance data, for example, or to allow for assistance data that cannot be provided with LPP. LPPe also may be useful in supporting additional position reporting formats or new positioning methods.

For uplink positioning, such as UTDOA, LMUs may be used. These LMUs may be standalone, integrated into eNodeBs or co-sited with eNodeBs. In LTE, UTDOA measurements such as uplink, UL, Relative Time of Arrival or UL-RTOA, are performed on Sounding Reference Signals, SRS. To detect an SRS, an LMU needs a number of SRS parameters to generate the SRS sequence that is to be correlated with the UL signals received by the LMU. SRS parameters would have to be provided in the assistance data transmitted by a positioning node to the LMU, where such data may be provided using LMUp. However, the positioning node generally does not know these parameters and must acquire such information from the eNodeB that configured the SRS parameters for the wireless device being positioned. LPPa or a similar protocol could be used to obtain such information.

The OTDOA positioning method relies on the wireless device measuring the timing of downlink signals from multiple eNodeBs. An LCS server provides assistance data to the wireless device, for making the measurements, which are then used to locate the wireless device in relation to the neighboring eNodeBs. In particular, the device measures the timing differences for downlink reference signals received from multiple distinct locations. For each measured neighbor cell, the device measures the RSTD, which is the relative timing difference between the neighbor cell and the reference cell. The UE position estimate is then found as the intersection of hyperbolas corresponding to the measured RSTDs. At least three measurements from geographically dispersed base stations with a good geometry are needed to solve for two coordinates of the terminal and the receiver clock bias. In order to solve for position, precise knowledge of the transmitter locations and transmit timing offset is needed.

The RSTD measurement can be intra-frequency, inter-frequency and/or involve CA. In the case of intra-frequency RSTD, all cells are on the same carrier as that of the serving cell. Inter-frequency RSTD measurements involve measurements on at least one cell that belongs to a frequency/carrier that is different than that of the serving/primary cell. In case of CA, the RSTD is measured on the PCell and/or the SCell, and one or more respective neighbor cells on the same PCC and/or SCC.

With reference to 3GPP TS 36.211, new physical signals dedicated for positioning have been introduced in LTE to facilitate positioning measurements of a proper quality and for a sufficient number of distinct locations. These new signals are referred to as Positioning Reference Signals or PRS, and 3GPP has introduced new low-interference positioning subframes, to further enhance positioning measurements made on the PRS.

PRS are transmitted from one antenna port—port R6—according to a pre-defined pattern that is specified in 3GPP TS 36.211. A frequency shift, which is a function of Physical Cell Identity or PCI, can be applied to the specified PRS patterns, to generate orthogonal patterns and model an effective frequency reuse of six. This arrangement makes it possible to significantly reduce neighbor cell interference on the measured PRS and thus improve positioning measurements. Even though PRS have been specifically designed for positioning measurements and in general are characterized by better signal quality than other reference signals, the standard does not mandate using PRS. Other reference signals, e.g. Cell-specific Reference Symbols or CRS could in principle be used for positioning measurements.

PRS are transmitted in pre-defined positioning subframes grouped by several consecutive subframes. These positioning occasions occur periodically with a certain periodicity of N subframes, i.e. the time interval between two positioning occasions. See FIG. 2 for an example depiction. The standardized periods of N are 160, 320, 640, and 1280 milliseconds, and the number of consecutive subframes may be 1, 2, 4, or 6, as set forth in 3GPP TS 36.211.

Because OTDOA-based positioning requires the measurement of PRS from multiple distinct locations, the wireless device may have to deal with PRS that are much weaker than those it receives from its serving cell. Further, if the wireless device does not have approximate knowledge of when the PRS are expected to arrive in time and the exact PRS pattern used for them, it is obligated to perform signal searching within a large window. Such processing affects the time and accuracy of the measurements, as well as the required device complexity. The earlier mentioned assistance data facilitates positioning measurements made by the wireless device on PRS, by providing it with reference cell information, neighbor cell lists containing the PCIs of neighbor cells, the number of consecutive downlink subframes used for PRS, PRS transmission bandwidth, frequency, etc.

Although PRS and positioning subframes have been standardized for OTDOA-based timing measurements, PRS may be used for other measurements as well. For example, more than just positioning measurements may be performed during positioning subframes. Further, PRS may be measured for purposes other than positioning, such as RSRP and RSRQ measurements. One may refer to PCT/SE2010/051079 for example details and it is noted that in the current standard, RSRP measurements are averaged, without differentiating between measurements made during positioning and non-positioning subframes.

PRS signals can be transmitted with zero power or muted, which should then apply for all PRS resource elements within the same subframe over the entire PRS transmission bandwidth. Muting lowers interference so that OTDOA RSTD measurements can be performed at a lower SINR level. This in turn enables the wireless device to detect and measure a large number of distinct cells or locations, e.g., up to sixteen locations, including the reference cell, according to pre-defined OTDOA RSTD requirements. The particular manner in which PRS are muted has not yet been specified in 3GPP and no signaling is available to notify wireless devices as to whether PRS transmissions in a given cell are to be muted in a certain subframe or not. One possible approach is to have the positioning node send assistance data to the wireless device, where that data indicates muting information for a given cell or cells, e.g. the muting pattern used in a cell.

In regards to measurements, the definitions of currently standardized measurements are found in 3GPP TS 36.214. These measurements are done in LTE for various purposes. For instance, some of these purposes include mobility measurements, which may be referred to as RRM measurements, positioning measurements, Self Organizing Network or SON measurements, Minimization of Drive Tests or MDT measurements, etc. It is typically mandatory for all wireless devices to support all intra-RAT measurements, i.e., inter-frequency and intra-band measurements, and to meet the associated requirements. However, the inter-band and inter-RAT measurements are device capabilities, which are reported to the network during call setup. A device supporting certain inter-RAT measurements should meet the corresponding requirements. For example, a device supporting LTE and WCDMA should also support intra-LTE measurements, intra-WCDMA measurements, and inter-RAT measurements, such as measuring WCDMA when the serving cell is LTE and measuring LTE when the serving cell is WCDMA. Hence, the network can use these capabilities according to some strategy. These capabilities are highly driven by factors such as market demand, cost, typical network deployment scenarios, frequency allocation, etc.

RRM measurements are performed to support RRM, which ensures the efficient use of the available radio resources and provides mechanisms that enable E-UTRAN to meet radio resource related requirements. In particular, RRM in E-UTRAN provides mechanisms for managing radio resources, taking into account single and multi-cell aspects. Example RRM functions include radio bearer control, radio admission control, connection mobility control, dynamic resource allocation and packet scheduling, inter-cell interference coordination, ICIC, certain SON functions related to radio resources, and load balancing. RRM may be intra-RAT and inter-RAT, and the supporting RRM measurements may be intra-frequency, inter-frequency and inter-RAT. Radio nodes and/or the UEs or other wireless devices operating in the E-UTRAN make RRM measurements, and the information may be collected and used by the network in a centralized or distributed manner.

Radio Link Monitoring or RLM represents a particular type of RRM measurement. RLM is based on out-of-sync and in-sync detection of a serving cell. Cell identification reporting represents another type of measurement supporting functions such as E-UTRA cell search, inter-RAT UTRAN cell search, System Information, SI, acquisition, etc. Other RRM measurements include UE transmit power or UE power headroom. The transmit power or power headroom of a device is the difference between the maximum output power of the device and the actual transmit power and is expressed on a log scale. Radio node transmit power, e.g., total or for specific channels or signals, is another type of RRM measurement. Other example measurements include signal strength and signal quality in general, interference and path loss measurements, or timing measurements.

Timing measurements may be performed in support of RRM, positioning, SON, MDT, etc. In LTE, Release 9 standardizes time measurements such as UE Rx-Tx time difference, eNodeB Rx-Tx time difference, Timing Advance or TA, RSTD, UE GNSS Timing of Cell Frames for UE positioning, and E-UTRAN GNSS Timing of Cell Frames for UE positioning. The UE and eNodeB Rx-Tx and TA measurements are similar to round trip time, RTT, measurements used in older network types, and are based on both downlink and uplink transmissions. In particular, for UE Rx-Tx, the device measures the difference between the time of the device's uplink transmission and the received downlink transmission that occurs afterward. For eNodeB Rx-Tx, the eNodeB measures the difference between the time of the eNodeB's downlink transmission and the time of the received uplink transmission that occurs afterward. Additionally, LTE defines timing measurements that are implementation-dependent and are not explicitly standardized, such as one-way propagation delay measurements. eNodeBs, for example, use measurement of one-way propagation delay for estimation of the TA value to signal to a target device.

Inter-frequency measurements in principle may be considered for any positioning method, even though currently not all measurements are specified by the standard as intra- and inter-frequency measurements. Examples of inter-frequency measurements currently specified by the standard are RSTD used for OTDOA, and RSRP and RSRQ, which may be used for functions such as fingerprinting or E-CID. A wireless performs inter-frequency and inter-RAT measurements in measurement gaps. The measurements may be done for various purposes, such as mobility, positioning, SON, MDT, etc. Furthermore, the same gap pattern is used for all types of inter-frequency and inter-RAT measurements. Therefore an E-UTRAN must provide a single measurement gap pattern with constant gap duration for concurrent monitoring, for cell detection and measurements, on all frequency layers and RATs.

In more detail, LTE measurement gaps are configured by the LTE network to enable measurements on the other LTE frequencies and/or other RATs, such as UTRA, GSM, CDMA2000, etc. The gap configuration is signaled to wireless devices operating in the LTE network over RRC protocol, as part of measurement configuration information. A wireless device that requires measurement gaps for OTDOA positioning measurements may send an indication to the network via its serving eNodeB, for example. The network responds to the indication by configuring the measurement. Furthermore, the measurement gaps may need to be configured according to a certain rule. An example rule states that inter-frequency RSTD measurements for OTDOA necessitate that the measurement gaps are configured according to the inter-frequency requirements in 3GPP TS 36.133, Section 8.1.2.6, meaning gap pattern #0 shall be used when inter-frequency RSTD measurements are configured and there should not be measurement gaps overlapping with PRS occasions of cells in the serving frequency.

Inter-RAT measurements are also notable for several reasons. Generally in LTE, inter-RAT measurements are typically defined similarly to inter-frequency measurements. This means that they may also require configuring measurement gaps Examples of inter-RAT measurements specified currently for LTE are UTRA FDD CPICH RSCP, UTRA FDD carrier RSSI, UTRA FDD CPICH Ec/No, GSM carrier RSSI, and CDMA2000 1×RTT Pilot Strength.

For positioning, assuming that LTE FDD and LTE TDD are treated as different RATs, the current standard defines inter-RAT requirements only for FDD-TDD and TDD-FDD measurements, and the requirements are different in the two cases. There are no other inter-RAT measurements specified within any separate RAT for the purpose of positioning and which are possible to report to a positioning node, such as the E-SMLC in LTE. Inter-RAT positioning measurement reporting may be possible with LPPe. However, for devices requiring measurement gaps, the current standard does not allow configuring the measurement gaps for other than inter-frequency RSTD measurements.

Additionally, inter-band measurements refer to the measurement done by a wireless device on a target cell on the carrier frequency belonging to a frequency band that is different than that of the serving cell. Both inter-frequency and inter-RAT measurements can be intra-band or inter-band. Inter-band measurements complement the interest of network operators, where a single network operator owns carriers in different bands and would prefer to make efficient use of carriers by performing load balancing on different carriers. Consider the well-known example of a multi-band GSM terminal capable of operating on 800/900/1800/1900 bands.

SUMMARY

This disclosure provides example illustrations of device-side and network-side methods and apparatuses for avoiding more than a permitted level of interruption on a serving cell in association with the device making Radio Resource Management, RRM, and positioning measurements on one or more Secondary Component Carriers, SCCs, corresponding to one or more of the Secondary Cells, SCells, that are configured for the device according to a carrier aggregation, CA, configuration. Among the several advantages flowing from these teachings, a wireless device avoids exceeding a permitted level of interruption on a serving cell downlink or uplink by aligning the positioning and RRM measurements with respect to each other, to avoid exceeding a permitted level of interruption on the serving cell. The measurement alignment may be realized at least in part via adaptation of the corresponding measurement configurations, and such adaptations may be performed by the wireless device, by a radio network node, and/or by a positioning node.

An example method relates to performing measurements on one or more cells of a multi-carrier wireless communication network on at least one configured SCC. A wireless device configured for carrier aggregation performs the method and, in this context, the device is served by at least one serving cell of the network. The method includes receiving a PRS configuration for configuring positioning measurements to be made by the device with respect to at least one cell on the SCC, and receiving an SCell measurement cycle configuration for configuring RRM measurements on at least one cell on the SCC. The method continues with performing the positioning and RRM measurements according to the PRS and SCell measurement cycles configurations, respectively, including aligning the positioning and RRM measurements with respect to each other, to avoid exceeding a permitted level of interruption on the serving cell.

An example of a wireless device configured to carry out the above method, or variations of it, includes a transceiver and one or more operatively associated processing circuits. The transceiver is configured to send signals to and receive signals from the network, and one or more processing circuits are configured receive the PRS and SCell measurement cycle configurations, for configuring measurements by the device on at least one cell on an SCC configured for the device according to its CA configuration, and to align those positioning and RRM measurements with respect to each other, to avoid exceeding a permitted level of interruption on a serving cell of the device.

In a network-side example, a network node performs a method in a multi-carrier wireless communication network of preventing more than a permitted level of interruption on a serving cell of a wireless device operating according to a carrier aggregation configuration. The method includes determining an alignment needed between positioning measurements and RRM measurements to be made by the device on at least one cell on a configured SCC, so as to avoid exceeding a permitted level of interruption on a serving cell of the device. Further, the method includes adapting at least one of an SCell measurement cycle configuration that controls the RRM measurements on the at least one cell on the SCC and a PRS configuration that controls the positioning measurements on the at least one cell on the SCC, based on the determined alignment. Still further, the method includes sending the adapted configuration or configurations to the wireless device and/or a serving radio network node of the device, e.g., where the node performing the adapting is not the serving radio network node.

In an example, configuration, a network node is configured to carry out the above method, or variations of it, and includes a communication interface and one or more operatively associated processing circuits. The communication interface is configured for communicating with one or more other network nodes in the network and/or communicating with a wireless device operating in the network according to a carrier aggregation configuration. The one or more processing circuits are configured to prevent more than a defined level of interruption on a serving cell of the device, based on being configured to determine an alignment needed between positioning measurements and RRM measurements to be made by the device on at least one cell on a configured SCC, so as to avoid exceeding a permitted level of interruption on a serving cell of the device. Correspondingly, the processing circuit(s) are configured to adapt at least one SCell measurement cycle configuration that controls the RRM measurements on at least one cell on the SCC and a PRS configuration that controls the positioning measurements on at least one cell on the SCC and, based on the determined alignment, send the adapted configuration or configurations to the device and/or a serving radio network node of the device.

In another example, a wireless device is configured for operation in a multi-carrier wireless communication network and is configured to detect that a condition for invoking a configuration rule is met. Here, the configuration rule, according to a defined probability, prevents or reduces Uplink, UL, transmission interruptions that arise from multi-carrier positioning and/or RRM measurements made by the device with respect to a configured PCC and one or more SCC included in a carrier aggregation configuration of the device. The device according to this example is further configured to adapt one or more measurement settings according to the configuration rule, where the measurement settings control the multi-carrier positioning and/or RRM measurements made by the device on one or more cells on the SCC, and to perform the positioning and/or RRM measurements according to the adapted measurement settings.

In an additional example, a network node is configured for operation in a multi-carrier wireless communication network, and is configured to determine an UL transmission configuration for a wireless device according to a configuration rule. Here, the rule, according to a defined probability, prevents or reduces UL transmission interruptions that arise from multi-carrier positioning and/or RRM measurements made by the device with respect to a configured PCC and one or more SCC included in a carrier aggregation configuration of the device. The network node is further configured to adapt one or more UL transmission configuration settings according to the configuration rule, and send the adapted UL transmission configuration settings to the device, or to a serving radio network node of the device, for transfer to the device.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
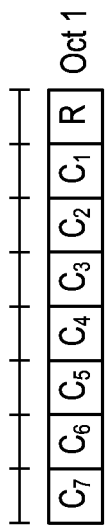
FIG. 1 is a diagram of a MAC control element for signaling Secondary Cell, SCell, activation/deactivation to a wireless device operating according to a carrier aggregation configuration having one or more configured SCells.
Figure 2:
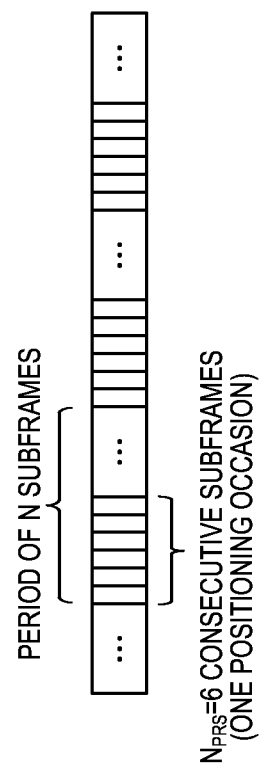
FIG. 2 is a diagram illustrating the occurrence and length of a given positioning occasion associated with the positioning measurements at issue herein, in one or more embodiments.
Figure 3:
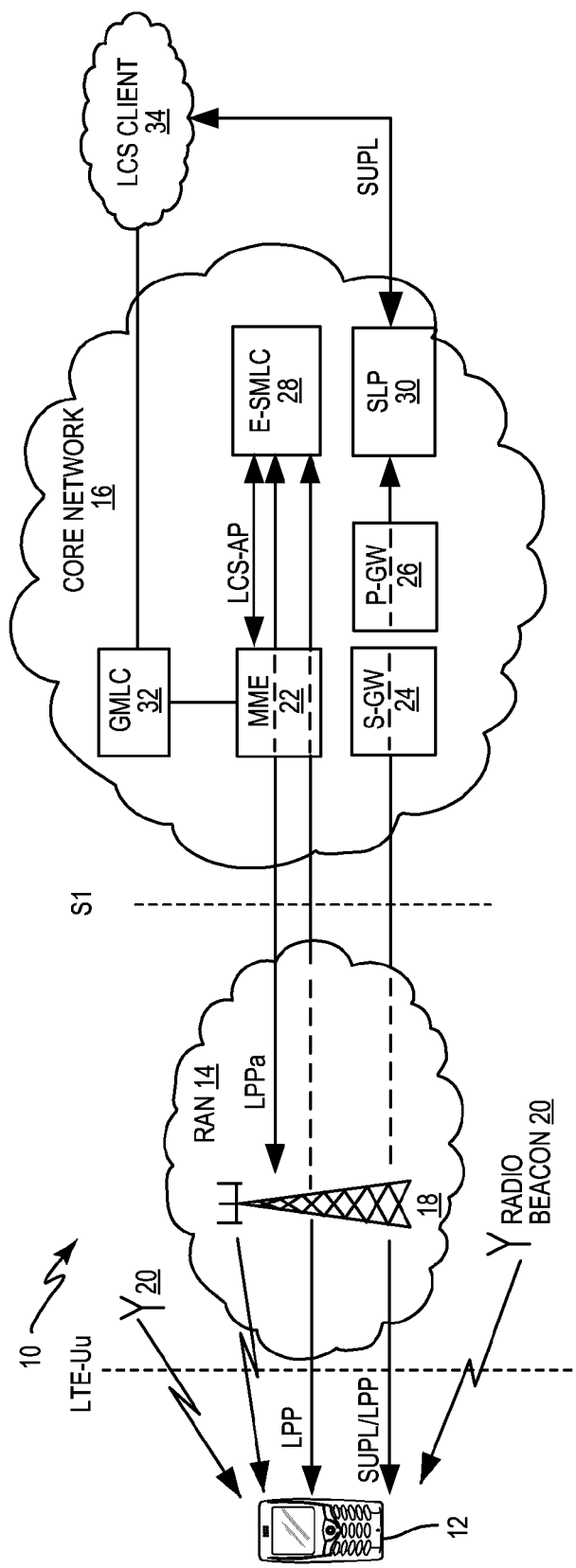
FIGS. 3 and 4 are block diagrams of an example multi-carrier wireless communication network in one embodiment, wherein a wireless device and/or one or more nodes in the network are configured according to the teachings herein.

FIG. 3 depicts an example multi-carrier wireless communication network 10, which hereafter is referred to as "network 10." While the depiction presents the network 10 in terms of an LTE-based, E-UTRAN, embodiment, the teachings herein are not so limited. For example, the network 10 may comprise a UTRAN network offering HSPA-based multi-carrier services. However, in the illustrated context, the example network 10 provides communication services to a potentially large number of wireless devices 12, and it includes a Radio Access Network, RAN, 14, which connects to a Core Network, CN, 16.

The RAN 14 includes one or more base stations 18, which are referred to as eNodeBs in E-UTRAN—only one base station 18 is depicted for convenience. The RAN 14 further includes one or more radio beacons 20, and provides wireless connectivity for any number of wireless devices 12, which are referred to in 3GPP parlance as "User Equipments" or UEs. However, the term wireless device 12—or simply "device 12" for convenience—should be given broad construction. By way of non-limiting example, the device 12 may be a smart-phone, tablet, computer, PDA, and other wireless-enabled device or module. The device 12 also may be essentially any type of radio network node equipped with a UE-like interface, such as a relay, a small Radio Base Station or RBS, an eNodeB, a femto Base Station or BS, etc. Further, the wireless device 12 may be configured to support multiple technologies, such as GSM, UTRA FDD and E-UTRAN FDD. Since all UTRA and E-UTRA bands are common, a multi-RAT implementation of the wireless device 12 may support the same bands for all the supported RATs.

The CN 16 includes a Mobility Management Entity, MME, 22, a Serving Gateway, S-GW, 24, a Packet Gateway, P-GW, 26, an E-SMLC 28, an SLP 30, a Gateway Mobile Location Center or GMLC 32, and is shown as being communicatively coupled to one or more external LCS clients 34. One sees control-plane positioning signaling involving the LPP, LPPa, and LCS-AP protocols and connections, along with user-plane positioning based on SUPL/LPP protocols and connections. In an LCS example, the wireless device 12 is the LCS target, and the LCS Server is the E-SMLC 28 or the SLP 30. The SLP 30 may comprise two components, an SPC part—SUPL Positioning Center—and an SLC part—SUPL Location Center. The two parts may reside in different nodes. In an example implementation, the SPC part of the SLP 30 has a proprietary interface with the E-SMLC 28, and Llp interface with the SLC part, which in turn communicates with the P-GW 26 and one or more external LCS clients 34.

Additional positioning architecture elements may also be deployed to further enhance performance of specific positioning methods. For example, deploying radio beacons 20 as shown in the RAN 14 is a cost-efficient solution that may significantly improve positioning performance indoors and also outdoors, by allowing more accurate positioning, for example, with proximity location techniques.

Figure 4:
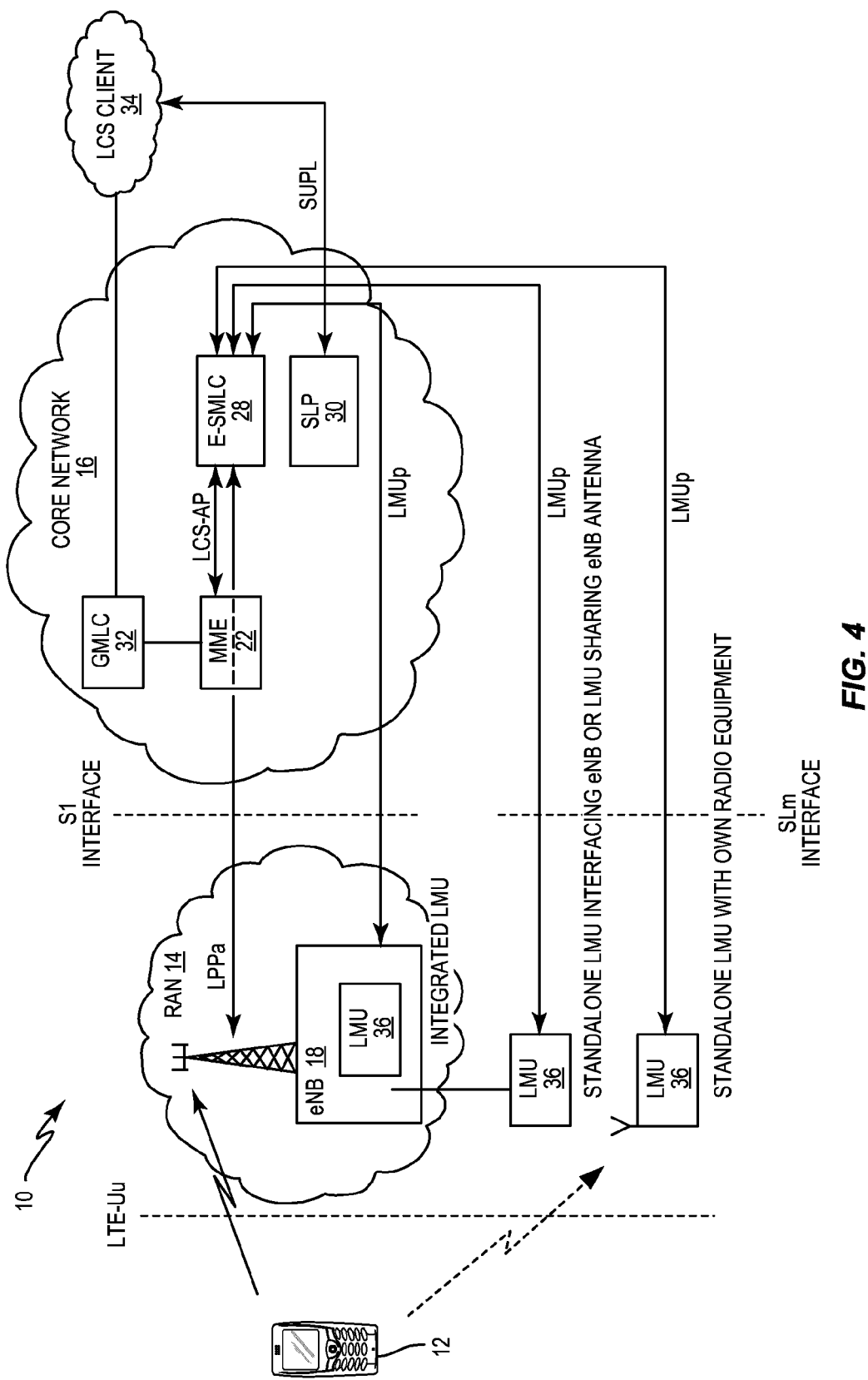

Further, as shown in FIG. 4, which focuses on elements, protocols and connections associated with UL-based positioning, one sees that the RAN 14 may include one or more LMUs 36, which may be standalone or integrated in or co-located with respective base stations 18 in the RAN 14. Communications between the E-SMLC 28 and the LMUs 36 may be based on the LMUp protocol.

It will be appreciated that the one or more base stations 18 in the RAN 14 provide service in corresponding "cells," which may be regarded as the intersection between allocated air interface resources and corresponding geographic areas of coverage. Thus, a given base station 18 may provide service in more than one cell using, for example, a different carrier for each such cell. Cells may partially or wholly overlap, and neighboring base stations 18 may each offer one or more cells on different carriers. In this multi-carrier context, the teachings herein provide advantageous operation in a number of example situations. Consider the case where the wireless device 12 operates according to a CA configuration that includes one or more configured SCells on one or more corresponding SCCs. When an SCell is added to or removed from the CA configuration of the wireless device 12—referred to as configuration and de-configuration, respectively—corresponding interruptions may occur on the PCell of the device 12. Similarly, interruptions may arise as a consequence of the device 12 changing the BW configuration of its transceiver in response to the activation or de-activation of one or more configured SCells.

Depending on the SCell measurement cycle, which is defined by the SCell measurement configuration of the device 12, and further depending on whether a common DRX is used between the PCell and all SCells, SCell activation, de-activation, configuration and de-configuration events may cause corresponding interruptions on the PCell of the device 12. In particular, if the SCell measurement cycle is greater than or equal to 640 milliseconds and a common or same DRX is not used, interruptions can arise on the PCell. Such interruptions degrade positioning measurement performance and positioning accuracy. In particular, the interruptions of RSTD measurements on the reference cell may have a stronger impact on positioning accuracy than interruptions of measurements on other cells, since the reference cell is involved in multiple RSTD measurements. That is, each RSTD measurement involves two cells; namely, the reference cell and another cell.

In one aspect of the teachings herein, a "node" performs a method of adapting a measurement cycle configuration of a device 12, for positioning in the context of the device 12 operating in the network 10 according to a CA configuration. In particular, the method advantageously results in the device 12 operating with acceptable levels of interruption on the device's configured PCell—e.g., the device 12 conducts measurements in a manner that avoids exceeding more than a permitted level of interruption on the PCell.

According to one example embodiment, an SCell measurement cycle and/or a PRS configuration are adjusted by the relevant node to ensure that the device 12 maintains an acceptable level of interruption on the PCell while a measuring node performs one or more positioning measurements. Example measuring nodes in this context include the same device 12, another device 12, an LMU 36, or a base station 18. These teachings may be applied to prevent interruptions on the downlink and/or uplink.

For example, consider the adaptation of an SCell measurement configuration and/or a PRS configuration of a given device 12, so that the RRM and positioning measurements made by the device 12 on an SCC are adapted in a manner that avoids or minimizes interruptions on the PCell of the device 12. For example, the permitted level of interruption may be defined in terms of the probability of missed packets—e.g., missed ACK/NACK—such that the device 12 is permitted to miss such signaling with a probability of less than five percent.

In an example approach to the contemplated adaptation, the SCell measurement cycle is set above a defined threshold, e.g., above 320 milliseconds, provided the PRS periodicity—positioning occasion periodicity—is below a threshold. For example, the SCell measurement cycle is set so that it at least partially overlaps with the positioning measurement cycle. This alignment may be achieved by setting the start or end of the SCell measurement cycle to at least partly overlap the positioning occasions on the SCell, e.g., overlap by an amount greater than X percent. The overlap enables the device 12 to perform RRM measurements and positioning measurement around the same time, thereby avoiding separate interruptions arising from the two different types of measurements. That is, the device 12 performs RRM measurements according to measurement cycle defined by the SCell measurement configuration and performs positioning measurements according to the positioning occasions defined by the PRS configuration, and the at least partial overlap between the RRM measurements and the positioning measurements reduces or eliminates the interruption(s) that would arise on the PCell of the device 12 if the two types of measurements were performed without at least partial alignment.

Particular examples of establishing the desired alignment include setting the SCell measurement cycle to ensure it starts or ends within not more than X milliseconds, e.g., 5 milliseconds, of the SCell positioning occasions. In another example, the adaptation comprises setting the SCell measurement cycle to avoid overlapping with positioning measurements on the PCell, or at least to avoid no more than a certain amount of overlap, e.g., no more than X subframes of overlap, with positioning occasions on the PCell, so that interruptions arising from the RRM measurements on the SCell do not disturb positioning measurements on the PCell. In yet another example, the measurement cycle for RRM measurements on the SCell is set so as not to not exceed the PRS periodicity. This arrangement avoids wasting positioning occasions. In another approach, the measurement cycle for RRM measurements is controlled so as not to be shorter than the PRS periodicity, when the device 12 is only performing positioning measurements. Yet another approach is based on jointly setting the RRM measurement cycle and the PRS periodicity below a common threshold, e.g., the measurement cycle is set equal to or less than 320 milliseconds. It is also contemplated to set the measurement cycle regardless of the PRS periodicity if DRX is configured for the involved device 12.

Broadly, the adaptation may be based on a permitted or allowed level of interruption—e.g., a 0.5% to 1% probability of missed packets on the PCell—based on one or more "rules." An example rule is to set the measurement cycle to not exceed a defined threshold, which may be denoted as "threshold_2," where threshold_2>threshold_1. In an example case, threshold_2 is 640 milliseconds and the SCell measurement cycle for making RRM measurements on the associated SCC is set to be less than or equal to 640 milliseconds.

Other example rules include setting at least one of an SCell measurement cycle and PRS periodicity below threshold_2. Broadly, any such formulated rule may be relaxed to accept some low interruption, e.g., a smaller overlap between measurement cycles and PRS periodicity may be configured or a larger period in which the measurement cycle is permitted to start or end may be configured. The rule and adaptation may be configured with respect to any larger, permitted level of interruption, e.g., interruptions in which the probability of missed ACK/NACK on the PCell exceeds one percent, based on, for example, setting the measurement cycle above a third threshold, threshold_3, or setting any suitable measurement cycle and PRS periodicity.

In the example case that a node adapts the SCell measurement cycle of a given wireless device 12, to prevent more than a permitted level of interruption on the PCell configured for that device, the node in one or more embodiments may acquire any one or more of the following information items: the relevant PRS configuration, such as PRS periodicity, the number of PRS subframes in a PRS occasion, muting pattern, measurement pattern, transmit pattern, etc. The configuring node may also acquire information indicating the level of interruption or interruption probability of packets permitted on the PCell—e.g., in terms of missed ACK/NACK. Such information may be expressed as a function of the SCell measurement cycle and/or PRS periodicity when SCell is deactivated. The node also may obtain information indicating whether or not a common DRX is configured for the PCell and the SCell(s), and/or may acquire general activity/inactivity patterns.

PRS configuration information may be obtained from a local database stored within the node, or be received via cross layer communication, such as by reading assistance data sent from the positioning node to the wireless device 12. More broadly, such information may be obtained from another node in the network, such as O&M, SON, or positioning node. To the extent that a given wireless device 12 is signaled assistance data indicating a PRS configuration different from what is actually configured in the corresponding cell, adaptation of the SCell measurement cycle to avoid exceeding more than the permitted level of serving cell interruption should be based on the PRS configuration signaled to the wireless device 12.

The permitted level of PCell interruption probability may be known from predetermined or predefined information stored in the node's memory, or received by the node, or obtained from a predefined rule in certain conditions—e.g., during positioning measurements. The level of interruption may be a target interruption level that may be statically or dynamically configured. The level of interruption may be the current level of interruption, which may be estimated or measured, or it may be a predicted level—e.g., based on one or more input characteristics.

The relevant DRX configuration or activity/inactivity pattern: may be obtained explicitly from a received indication or measurement configuration containing DRX or pattern information signaled to the wireless device 12 or to another node. Alternatively, such information may be obtained implicitly, from the type of service in use. For example, Voice over IP or VoIP typically is used in conjunction with 20-40 millisecond DRX cycle.

As for acquiring "PRS configuration information" for determining how to adapt the SCell measurement cycle on a given SCC for a given wireless device 12 operating according to a CA configuration, to prevent that device from exceeding more than a permitted level of interruption on a serving cell, such information can be broadly referred to as "positioning signal configuration" information. In an example case, positioning signal configuration information indicates the configuration of any signal, uplink or downlink, used for positioning measurements. The signal may be a PRS as defined in 3GPP TS 36.211, but more broadly may be any physical signal, such as PRS, CRS, synchronization signals, or any common or device-specific signals that can be measured in positioning subframes, and for which positioning occasions are configured with a periodicity different from the periodicity of the physical signal transmissions. Example physical signals transmitted in the uplink that may be used for positioning includes SRS and/or DMRS.

The phrase "PRS configuration" also has a broad meaning. For example, the PRS configuration may comprise PRS transmission configuration information and may indicate any one or more of the following: periodicity in time; periodicity of a bunch of time instances, such as positioning occasions or a number of consecutive subframes; a time interval or set of smaller time instances comprised in a bunch, a transmission pattern of the signal in time and/or frequency; a muting pattern, such as a PRS muting pattern as defined in 3GPP TS 36.355 of the signal in time and/or frequency; an offset or a shift of a pattern with respect to a certain time instance, such as a predefined subframe or SFN0; a time and/or frequency resource for transmission; a transmit pattern or a measurement pattern; and a transmission bandwidth or measurement bandwidth.

The term "PRS periodicity" as used herein may refer to an effective periodicity of a signal used for positioning measurements—i.e., the effective periodicity is the periodicity of the actually transmitted signals. For example, consider a nominal PRS periodicity of 160 milliseconds in combination with a muting pattern that indicates that the positioning signal is muted in each second positioning occasion. With muting applied to every other positioning occasion, the effective periodicity is 2×160 milliseconds=320 milliseconds.

Example positioning measurements on downlink, DL, PRS include any one or more of: DL Time of Arrival or TOA; DL Time Difference of Arrival or TDOA; DL Angle of Arrival or AoA; RSTD measurements Observed TDOA or OTDOA positioning, timing measurements for E-CID, received signal and received quality measurements for E-CID, DL propagation delay, any DL positioning measurement, such as defined in 3GPP TS 36.214, any positioning measurements involving at least one DL measurement component, such as two-way propagation delay, RTT, TA, or Rx-Tx measured on DL and UL signals. Example positioning measurements on uplink, UL, signals may comprise any one or more of the following items: UL TOA, UL TDOA, UL AoA, UL RTOA measurements, timing measurements for E-CID, received signal and received signal strength performed on UL signals for positioning, any UL measurement, such as defined in 3GPP TS 36.214, any positioning measurements involving at least one UL measurement component, such as two-way propagation delay, TA, RTT, or Rx-Tx measured on DL and UL signals.

Turning from example details regarding the types of signals that may be involved in the positioning and/or RRM measurements at issue herein, one may start with the basic context of a wireless device 12 operating in the network 10 according to a CA configuration in which one or more SCells on one or more SCCs are configured. In this context, the device 12 makes RRM measurements and positioning measurements on one or more cells on the SCC, according to an SCell measurement cycle configuration and a PRS configuration, respectively. As taught herein, one or both of those configurations may be "adapted" to align in some respect the RRM and positioning measurements made by the device 12, so as to prevent more than a permitted level of interruption on a serving cell of the device 12, e.g., no more than a 0.5% probability of missed ACK/NACK signaling on the PCell of the device 12. It should also be understood that the teachings herein can be applied in a joint sense, i.e., a certain level of interruption on the PCell may be jointly ensured in a multi-carrier network while also ensuring a certain level of interruption on UL signals or UL measurements.

The adaptation may be built into the configuring process. For example, a base station 18 may obtain knowledge of the relevant PRS configuration and set the SCell measurement cycle configuration accordingly. Alternatively, a positioning node in the network 10 may obtain knowledge of the relevant SCell measurement cycle configuration and set the PRS configuration accordingly. More generally, however, the adaptation is not necessarily done in the same node that fixed the configuration. For example, the device 12 may receive an SCell measurement cycle configuration and a PRS configuration, for configuring its RRM and positioning measurements on one or more cells on an SCC, and it may adapt one or both of those configurations to avoid those measurements causing more than a permitted level of interruption on a serving cell.

In general, the same node can perform configuring and the adapting actions, or different nodes may perform the two actions. For example, a device 12 may perform the adapting autonomously when performing or being requested to perform positioning measurements, or upon an indication received from a network node. In another example, a radio network node such as a base station 18, performs the adapting by, for example, sending an indication or configuration information to a wireless device 12, or to another node in the network 10 such as a positioning node. In yet another example, a network node indicates the need for or otherwise requests adaptation of the SCell measurement cycle. For example, the node sends an indication to a wireless device 12 that adaptation of the SCell measurement cycle is needed, or sends the configuration information to be adapted, or sends such information to a radio network node supporting the device 12, e.g., to the serving base station 18 of the device 12. Also note that it is contemplated herein to use implicit signaling in at least some embodiments, e.g., a positioning request from a positioning node may implicitly signal that adaptation is needed.

Additionally, or alternatively, the adaptation may be performed by a pre-defined rule, which may be pre-defined in a standardized sense. Therefore, a wireless device 12 may be pre-coded with one or more such rules, which it follows when any triggering conditions defined for such rules are met.

In one example of a rules-based adaption, a given wireless device 12 is permitted to cause an interruption, e.g. in terms of missed ACK/NACK of packets on at least its PCell, provided that both the PRS periodicity and the SCell measurement cycle for the same SCell are above respectively defined thresholds. For example, the rule may be that interruptions not in excess of a defined maximum level of interruption are permitted on the PCell, when both the SCell measurement cycle and the PRS periodicity are at or above a defined threshold, e.g., at or above 640 milliseconds, and when the device 12 is configured to perform measurements on the PRS and at least one measurement using the SCell measurement cycle. Example PRS measurements include RSTD and example RRM measurements using the SCell measurement cycle include cell identification RSRP, RSRQ, etc.

The rule may also apply for specific bandwidth(s) of the PCell and/or bandwidth(s) on the SCell(s). For example, smaller interruptions or no interruptions may be accepted for bandwidths below a threshold. In any case, according to this example rule, no measurement-related interruptions on the PCell are allowed when either the PRS periodicity or the SCell measurement cycle are below the defined threshold.

To avoid not exceeding the permitted level of interruption, the device 12 performs RRM measurements using the SCell measurement cycle and positioning measurements according to the PRS periodicity, based on some type or degree of alignment between such measurements. For example, it performs the RRM and positioning measurements at the same time or within a certain time window, whenever possible. The alignment allows the device 12 to minimize interruptions and enables it to meet the defined interruption level limits.

Consider, for example, an SCell measurement cycle and a PRS periodicity of 640 milliseconds and 320 milliseconds, respectively. Conventionally, the device 12 would make the RRM measurements according to the 640 millisecond S Cell measurement cycle, and independently make positioning measurements according to the 320 millisecond PRS periodicity, which translates into a probability of missed ACK/NACK signaling by the device 12 on the PCell of 0.5% and 0%, respectively. However, according to the above example rule, no interruption on the PCell is permitted because the PRS periodicity is below the defined threshold of 640 milliseconds. To comply with the defined rule, the device 12 at least partly aligns the SCell measurement cycle and the PRS periodicity, so that there is at least a partial overlap of the RRM measurements and the positioning measurements every 640 milliseconds.

In other words, the RRM and PRS measurements are overlapped in time, at least partly, every 640 milliseconds. Making the PRS and RRM measurements at least partly in parallel saves power at the device 12 and avoids violating the 0% interruption rule. It will be understood that the device 12 makes positioning measurements in between each SCell measurement cycle, according to the 320 millisecond PRS periodicity.

In another example, the permitted level of interruption depends upon whether DRX cycle is used or not and/or on DRX cycle length when DRX is used. For example, a device 12 may be permitted to have a non-zero level of interruption on the at least the PCell, provided that the PRS periodicity and the SCell measurement cycle for the same SCell are above respectively defined thresholds and no DRX cycle is used, or if DRX is used, the DRX cycle is below a defined threshold, e.g. not larger than 40 milliseconds.

In another example, the device 12 prevents more than a defined level of interruption on at least the PCell, by time-aligning the RRM measurements and the PRS measurements on an SCC, e.g., with a deactivated SCell, to within a defined margin. For example, the RRM measurements may be aligned with the positioning measurements to within a margin "y", where y is between 0 and 5 milliseconds. The allowed interruption level according to this rule is not more than 0.5% if both the SCell measurement cycle and the PRS periodicity are 640 milliseconds and are time-aligned or are time-aligned within 5 milliseconds.

In another example, the allowed interruption can be a function of the interruptions corresponding to the SCell measurement cycle and the PRS periodicity on the SCell. Examples of the function are minimum, maximum, weighted or arithmetic average, etc. To further exemplify the function assume 0.5% and 1% interruptions of packets are allowed on the PCell for an SCell measurement cycle and PRS periodicity on the SCell, respectively, for the case where both measurement periods—i.e., RRM and positioning—are both 640 milliseconds and are time aligned within 5 milliseconds. According to the minimum function, the maximum allowed interruption on at least PCell in this example is not more than 0.5%. The perfect time alignment or time alignment within the margin between PRS periodicity and SCell measurement cycle can be realized by the network 10, e.g., by the serving base station 18. For example, a node in the network 10 configures the start of the SCell measurement cycle at a specific time instance, e.g., when a specific type of subframe starts. More specifically, the serving base station 18 for the device 12 can configure the SCell measurement cycle at the start of a PRS occasion or at a time instance that is within a defined time range before the start or after the end of the PRS occasion, for the PRS transmitted on the SCell. An example time range is 5 milliseconds.

In a variation of the above rule, the permitted level of interruption depends on whether a DRX cycle is used or not and/or on DRX cycle length, if DRX is used. For example a device 12 may cause interruption on at least the PCell as defined in the above example, provided that no DRX is used, or provided that the DRX cycle is below a threshold, e.g., 40 milliseconds or lower.

The adaptation for aligning positioning and RRM measurements may be made proactively, or made blindly without respect to knowing the actual activation status of a given SCell. Alternatively, the adaptation may be based on knowing the activation status of the SCell, e.g., when the SCell is active. More broadly, the adaptation may be performed responsive to receiving an indication, such as upon receiving an indicator indicating the SCell activation status or upon configuring the activation state of the SCell. Further, the adaptation may be performed for more than one wireless device 12. For example, the adaptation may be performed for a device 12 in a first cell, e.g., as its PCell, where the device 12 is configured to perform measurements for positioning with respect to an SCell, or for all devices 12 in the first cell, at least for the case where there is at least one positioning session in the cell, or for CA-capable devices 12, based on knowledge of CA-capability, for any or all devices 12 configured for positioning measurements involving a certain cell, such as a certain PCell, SCell, or any cell on a non-primary frequency.

Given ones of the network nodes also may have awareness of the above rules, e.g., the base stations 18 and/or positioning nodes such as an E-SMLC 28 or SLP 30 may have such awareness. Thus, an example network node as contemplated herein may attempt to create conditions leading to the fulfillment of one or more above mentioned pre-defined rules. This depends upon the level of acceptable interruption desired by the network 10 on at least the PCell of a given wireless device or devices 12. For example assume that the network 10 is using the PCell for a service or data that requires very low latency and low packet loss rate. However it is also important to minimize device power consumption and also reduce processing at the device(s) 12. In consideration of these factors, the serving base station(s) 18 or another node in the network 10 may configure the SCell measurement cycle for the involved device(s) 12 to be large, e.g., greater than 1280 milliseconds. The serving base station 18 optionally may inform the involved positioning node of the criticality of the situation, e.g., regarding the stringent Quality-of-Service, QoS, requirements for the involved type of service. The positioning node may in response configure a shorter PRS periodicity if possible, e.g., a PRS periodicity of 320 milliseconds. By application of one of the aforementioned rules, a device 12 in this case will not cause any interruption of packets on at least the PCell. A similar example can be applied in a converse manner, in the sense that the positioning node sets the PRS periodicity to a larger value, such as 1280 milliseconds, whereas the serving base station 18 sets the SCell measurement cycle to the smaller value, e.g., 320 milliseconds, to prevent interruptions on the PCell.

In either case, a node in the network generally sends the adapted configuration(s) to the targeted wireless devices 12, or at least sends an indication of the particular adaptation to be made to one or both the SCell measurement cycle and the PRS periodicity. In response, the device(s) 12 perform the involved measurements according to the adapted configurations. For example, a given device 12 performs cell search, RSRP, RSRQ and/or other measurements according to the adaptation. The performed measurements may be used for the purpose of one or more radio operations, such as being reported by the device 12 to the network 10, for taking cell change, handover or reselection decisions, for MDT purposes, and/or for changing PCells, SCells, etc.

Adaptation strategy is another aspect considered herein. In the various examples above, three strategies have been considered, including: (1) prevent any interruption; (2) limit interruptions to a low level; and (3) allow even large interruptions. Hence, for a given node to adapt or to consider adapting the SCell measurement cycle configuration of a given wireless device 12, the node may first need to obtain or determine the applicable strategy. In example, the node determines the strategy based on determining one or more reference or target interruption levels.

As noted in several examples, the level of interruption may be defined in terms of the probability of missed ACK/NACK on the PCell. In this regard, an example of what might be considered a low level of interruption is a probability of missed ACK/NACK of less than 0.5%. A medium level of interruption may be from 0.5% to 1%. Correspondingly, a high level interruption may anything above 1%, or any level of interruption associated with performance degradation on the PCell.

The adaptation strategy may be decided autonomously by the node(s) making the adaption, or decided according to a pre-defined rule, or decided dynamically based on one or more criteria. Further, in at least some cases, the node may be preconfigured to select only strategies corresponding to no interruption or only a low interruption. Still further, the node may receive an indication from another node as to the appropriate strategy, e.g., a positioning node may implicitly or explicitly signal the preferred strategy to the serving base station 18 of a device 12 being positioned, or vice versa.

When the preferred strategy is not preconfigured, i.e., static, the decision on which strategy to use may depend, among the others, e.g., on any one or more of the number of configured measurements on the SCell, the DRX cycle length, and the DRX cycle alignment among different CCs. For example, strategy selection may consider any one of the following: whether there are different DRX cycles on different CCs, whether the on duration of the DRX cycle over which the device 12 opens its receiver is different for different CCs, and whether the same DRX cycle is used on all CCs but is shifted in time on different CC, etc. Additionally, or alternatively, strategy selection may consider DRX overlap for the case when different DRX are configured for different CCs. As an example, the node may determine a set of common DRX resources defined herein as the overlap of DRX on-duration periods. In an example application of this, one strategy may be selected when the overlap is below a threshold and another strategy may be selected otherwise.

Other bases for strategy selection include the activity state of the device 12. For example, the strategy may be that no interruptions are permitted for the device 12 if it is in the RRC_CONNECTED state, while a certain level of interruption is allowed when the device 12 is in the IDLE state. The strategy determination decision also may consider whether the reference cell is on the PCC or not. For example, if the reference cell is on the PCell, no interruption or a low interruption may be desired, because interruptions on the PCell may also cause degradation of positioning measurements involving the PCell. For example, such interruptions potentially degrade RSTD measurements, which as explained are time difference measurements between the timing of two cells. In CA, the two cells may be both on the SCC of an SCell, both on the PCC of the PCell, or on the PCC and the SCC. In a given positioning request, the targeted device 12 is typically requested to perform RSTD for multiple cells with respect to a reference cell, which is to say that the reference cell is typically involved in multiple measurements.

Strategy selection may consider data transmission intensity on the PCell. For example, low or no interruption may be expected if there no or almost no transmissions on the PCell, which suggests that a more relaxed adaptation strategy may be adopted. Selection also may consider the data communication critically on the PCell. For example, for emergency calls, it may be decided that no interruptions or only a low level of interruptions are to be permitted.

In yet another example, strategy selection may consider the number of measured cells on the PCC. For example, if that number exceeds a defined threshold, then a strategy with a lower interruption on the PCell may be preferred. Otherwise, a higher permitted level of interruption on the PCell may be acceptable. Similarly, strategy selection may consider the number of measured cells on the SCC. For example, if the number of cells measured on the SCC of a given SCell in the CA configuration of the device 12 exceeds a defined threshold, then a strategy corresponding to no interruption or only a low level of permitted interruption may be preferred.

Strategy selection may consider the target positioning QoS, e.g., in terms of horizontal accuracy, vertical accuracy, or positioning response time, etc. Strategy selection also may consider the LCS Client or service type, e.g., a strategy enabling highest accuracy may be selected for emergency positioning and another strategy may be selected for best-effort location-based service. Still further, strategy selection may consider the positioning method. For example, a strategy with no or lower interruption may be desired for a specific positioning method, e.g., UTDOA or OTDOA, especially with all or most measurements are performed on PCC.

Regardless of the mechanism for triggering adaptation or selecting the strategy for adaptation, it is contemplated herein that a positioning node such as the E-SMLC 28 and/or the SLP 30 are configured to adapt the PRS configuration included in the assistance data sent to a given wireless device 12 having a configured SCell. Here, adaptation of the PRS configuration means adapting one or more of the PRS periodicity and number of PRS subframes in a PRS occasion. This embodiment is particularly useful in cases where the SCell measurement cycle cannot or will not be adapted. For example, the node(s) responsible for defining the SCell measurement cycle configuration may not have the capability of making such adaptations, or such adaptations may not be possible or permitted under certain service scenarios or conditions.

In such cases, at least to the extent possible, the positioning node adapts the transmission cycle of the signal(s) used for positioning measurements. The PRS configuration adaptation may depend on the SCell measurement cycle configured for the involved device 12 by its serving base station 18 and/or the level of interruption on the PCell permitted by the serving base station 18. Further, in some embodiments, the adaptation depends on whether DRX or an activity/inactivity pattern is configured or not.

The adaptation may be based on the above information for one or more UEs. For example, the adaptation may be performed for a majority of devices 12 in a given cell. For performing the adaptation, the involved may also collect statistics on the SCell measurement cycle configurations and perform the adaptation with respect to a measurement cycle commonly used by all such devices 12, or at least used by a majority of the devices 12. A positioning node may obtain such information according to an explicit indication received from the serving base station 18, or from an associated node, such as a relay. The positioning node also may use a pre-defined rule governing the acceptable level of interruption defined for a given SCell measurement cycle. Additionally, or alternatively, the positioning node may base its adaptation operations using an explicit indication received from a device 12, e.g. indicating the configured DRX cycle, SCell measurement cycle, etc. Of course, such information also may be obtained by the positioning node on an implicit basis, based on measurement requirements met by the device 12. For example, such information may be inferred based on the positioning node obtaining an indication of the measurement period of the enhanced cell ID RSRP and/or RSRQ measurements by the device 12.

In the same or another embodiment, a positioning node may adapt the PRS configuration if it receives explicit information from another network node or the device 12. For example, the serving node of the device 12 may indicate to the positioning node that it should align the PRS periodicity with the SCell measurement cycle if possible. The adaptation of the PRS configuration by the positioning node in relation to the SCell measurement cycle may also be based on one or more pre-defined rules. The aim of the rules is to avoid or minimize serving cell interruptions due to PRS measurements. Examples of such rules are: the PRS periodicity is aligned with SCell measurement cycle whenever possible; the PRS periodicity is aligned with the SCell measurement cycle whenever possible, provided that the SCell measurement cycle is within a pre-defined threshold; and the PRS periodicity is adapted such that measurements on the PRS do not cause any interruption on at least the PCell.

For example, consider a case where the PRS is transmitted on an SCell with the smallest possible periodicity of 160 milliseconds. This means the positioning node can in principle configure the device 12 to perform PRS measurements as fast as every 160 milliseconds. But assume that the device 12 is also configured with an SCell measurement cycle of 320 milliseconds for doing SCell measurements, such as cell search, RSRP, RSRQ, etc.

In one example of the teachings herein, the serving base station 18 of the device 12 indicates to the positioning node that the PRS periodicity is to be aligned with the measurement cycle. In another example, the positioning node follows a pre-defined rule that says that the PRS periodicity is to be aligned with the SCell measurement cycle. In either case, the positioning node sends to the device 12 assistance data indicating a PRS configuration having a periodicity of 320 milliseconds, to be used by the device 12 for performing positioning measurements on the SCell.

The device 12 may also adapt the SCell measurements such that it obtains measurement samples for the RRM measurements, e.g., RSRP measurements, and the positioning measurements, e.g., RSTD, at the same time, or during at least partly overlapping durations. In this way, the device 12 does not have to reconfigure its receiver separately for different types of measurements. That behavior in n turn avoids extra interruption due to PRS measurements on SCell and also improves battery life at the device 12.

Upon obtaining the above indication or information or based on a pre-defined rule, the positioning node adapts the PRS configuration, such as by setting a particular PRS periodicity, and signals the assistance data containing the adapted PRS configuration to the targeted device 12 for doing a positioning measurement. The device 12 in turn performs the requested positioning measurements, and may report results to the positioning node, or may use them to determine its own location, etc.

Thus, in one aspect of the teachings herein, the PRS configuration is adapted according to the SCell measurement cycle configuration and/or responsive to the adaptation of the SCell measurement cycle configuration. Additionally, the adaptation may be based on whether or not there is the capability of adapting the SCell measurement cycle configuration. It should be further noted that PRS may be UL and/or DL signals. An adapted PRS periodicity may be used to make positioning measurements on a deactivated cell, or for performing other measurements. In at least one embodiment, a positioning node, a base station 18, or other involved node may signal its adaptation capability. For example, a base station 18 or other radio network node may signal its ability to adapt the SCell measurement cycle configuration with respect to the PRS configuration. Conversely, a positioning node may signal its ability to adapt the PRS configuration with respect to an SCell measurement cycle configuration. Based on the result and/or on the capability, a node may adapt positioning measurement configuration, for positioning based on DL and/or UL radio signals.

Such adaptations may comprise, for example, configuring a reference cell for positioning measurements. In an example of this approach, a reference cell is configured on an SCell when an acceptable level of interruption could not be configured or the adaption was/is not possible. Configuring PRS in such a case may involve selecting or prioritizing the cells to be measured for positioning, such as, when adaptation is not possible, a lower priority may be given to selecting SCells. The configuration also may include selecting measuring radio network nodes, e.g., LMUs for UTDOA, and/or selecting a positioning method, e.g., if the adaptation is not possible, a positioning method involving the SCell may be not selected or given a lower priority. The node may also store the adaptation result from one or more devices 12, collect statistics and use this for configuring positioning measurements for other devices 12.

The teachings herein includes methods for controlling the interruption of UL transmissions and/or UL measurements. According to one embodiment, there may be one or more pre-defined rules, which may be specified in the applicable standard, and which are related to the occurrence of the interruption on one or more UL signals that are used by a measuring node for performing an UL measurement. SRS represents an example type of UL signal and UL RRM measurements and/or UL positioning measurements represent example types of the involved UL measurements.

The UL interruption can be expressed in terms of probability of interruption, such as the radio of number of interruptions in comparison to the total number of UL transmission instances over a certain time. The UL interruption may also be expressed as probability of missed ACK/NACK on the DL, in response to interruption of UL data transmission. The objective of the rule(s) is to avoid or minimize the interruption or to meet a certain level of interruption on UL signals when a radio node performs at least one UL measurement. One or more interruption levels and one or more adaptation strategies may be specified according to the rules contemplated herein.

Various types of nodes may follow one or more such rules. Example nodes include: a node transmitting the UL signal, such as a device 12; a node configuring UL transmissions, such as a serving base station 18 configuring an UL transmission for a wireless device 12; a node performing measurements on the UL signal, such as a base station or LMU. Such a node may configure and perform measurements on UL signals adaptively, according to the rule. For example, based on information that indicates whether at least one other node, such as the transmitting device 12, is following the rule. In one example, a higher detection threshold may be used when not following the rule, while the measuring node may be more certain about the transmitted signal when the rule is being followed, and thus may use a lower detection threshold to detect even weaker signals or use parameters typically associated with a lower detection probability than what would be used without the rule.

Such rules also may be applicable to a node controlling one or more parameters, such as the SCell measurement cycle, that may impact interruption of the UL signals. In one example, a device 12 may have to follow such a pre-defined rule when one or more conditions are met and/or when triggered by the network 10, such as where the serving base station 18 indicates that the device 12 should follow a pre-defined rule or a network node requests a certain measurement type. By following these rules the device 12 will have to adapt its DL measurement sampling rate and/or instances to ensure that it does not have to retune its receiver, or is not likely to have to return its receiver within a certain probability, when it is transmitting UL signals. This approach avoids or minimizes interruptions of UL transmissions by the device 12.

In another example, a node that configures UL transmissions is configured to follow a configuration rule, such that the interruptions on UL transmissions are minimized or do not exceed a certain level. In yet another example, a node that configures the SCell measurement cycle may follow a rule in which it configures the measurement cycle so that the interruption on UL transmissions is minimized or does not exceed a certain level. In a further embodiment, a node may configure UL transmissions and SCell measurement cycle jointly so that the interruption on UL transmissions is minimized or does not exceed a certain level and thereby follow a rule related to the occurrence of the interruption on one or more UL signals.

A rule related to the occurrence of the interruption on one or more UL signals may depend on one or more of the following conditions: type or characteristic of UL signal e.g. SRS, DMRS, etc.; type of UL measurement, e.g., positioning or CoMP, etc.; type of positioning method using the measurement, e.g., E-CID, UTDOA, AECID, UL positioning, etc.; criticality or priority of situation, service, e.g. emergency call; criticality or priority of measurement, e.g., emergency positioning measurement, etc.; number of UL measurements on the UL signal, where more measurements may mean more important and thus lower acceptable interruption; number of nodes involved in UL measurements on the UL signal, where more nodes may imply a lower acceptable interruption; type of radio node performing the UL measurement, e.g., eNodeB, LMU etc., where the availability of information about UL transmission configuration is typically lower at LMUs than at eNodeBs so the rule may be more important, such as having a different interruption target or apply only when UL measurements are performed by LMUs; the possibility or capability of adapting the SCell measurement cycle configuration, such as when the same node may configure UL transmission and measurement cycle or has the capability to adaptively configure measurement cycle to UL transmission configuration; measurement cycle configuration, e.g., periodicity of measurement cycle for used for DL measurements, and/or periodicity of UL signal; one or more relation, such as the relative shift in time or the amount of overlap, between the periodicities of the measurement cycle and the UL signal; the type of CA in use, such as intra-band, inter-band, intra-band non-contiguous or any combination thereof, etc.; the type of DL measurements performed using the SCell measurement cycle; the activation states of the SCells, such as where there is at least one deactivated SCell configured for the device 12; whether DRX cycle is used or not and/or according to the DRX configuration details, such as DRX cycle length; and measurement bandwidth of the UL measurement or transmission bandwidth of the UL signal, where it may be easier to achieve good performance for a larger bandwidth, so the rule may apply to certain bandwidths, e.g., to avoid or minimize interruption when the UL measurements bandwidth is below a threshold).

Further examples of the rules that may be predefined to avoid or minimize UL interruptions include: a rule that when configured with a measurement cycle for measurements on an SCell, the device 12 reconfigures its receiver when transmitting an UL signal used for UL measurement such that no interruption occurs on the UL signal; a rule that when configured with a measurement cycle for measurements on an SCell and transmitting an UL signal used for UL positioning measurement, the UE reconfigures its receiver such that no or a low interruption occurs on the UL signal; a rule that when configured with a measurement cycle for measurements on an SCell, the UE reconfigures its receiver when transmitting an UL signal used for UL measurement such that no interruption occurs on the UL signal provided the periodicities of the SCell measurement cycle and/or the UL signal are smaller than certain threshold, e.g., 640 milliseconds; a rule that when configured with a measurement cycle for measurements on an SCell, the UE reconfigures its receiver when transmitting an UL signal used for UL measurement such that interruption on the UL signal shall not exceed a certain margin, e.g. shall not exceed a probability of interruption of more than 1%; and a rule that when configured with a measurement cycle for measurements on an SCell, the UE reconfigures its receiver when transmitting an UL signal used for UL measurement such that interruption on the UL signal shall not exceed by a certain margin provided that the periodicities of the SCell measurement cycle and/or the UL signal are smaller than certain threshold, e.g., 640 milliseconds.

In another example, the above rules for avoiding or limiting UL interruptions may apply provided that the device 12 is configured with intra-band CA and/or is in non-DRX mode and/or if the applicable DRX cycle is less than a threshold, e.g., less than 40 milliseconds. In another example, an eNodeB or other such base station 18 may be restricted from configuring an SCell measurement cycle with certain configurations values, e.g., periodicities, while the device 12 is performing a positioning measurement, or the base station 18 may have to adapt the measurement cycle configuration and/or UL transmission configuration so that the interruption on UL transmissions and/or UL measurements does not exceed a certain level. In such a context, the "no interruption" condition may be considered as a special case of limiting interruptions.

Thus, it is recognized herein that the SCell measurement cycle configuration can be defined or otherwise manipulated to enhance UL positioning. Such operations may be viewed as representing an extension or complement of the above-identified rules for avoiding or limiting interruptions in UL transmissions and/or positioning measurements, or they may be viewed as a standalone solution.

In one example, the measurement cycle configured for a device 12 being positioned may be signaled to a radio network node, e.g., an eNodeB or LMU, which is performing UL measurements for positioning the device 12. In one example, this information may be signaled via SLmAP protocol, also known as the LMUp, over an SLm interface between the LMU and the positioning node. The positioning node may receive this information from the configuring node, e.g., the serving eNodeB via LPPa, for example. The positioning node and/or the measuring node may also store the received information for one or more devices 12.

In one or more embodiments of enhancing UL positioning according to the SCell measurement cycle configuration, a positioning node or a measuring node considers any one or more of the following items: an indication that the targeted device 12 is configured with CA; an indication of whether some of the configured UL transmissions may be not transmitted due to bandwidth reconfigurations and interruptions, given that the device 12 is not able to transmit or receive when interruptions occur; an indication that at least one of the SCells configured for the device 12 is deactivated; and an indication that the device 12 may cause interruption in the UL and/or in the DL due to reconfiguration of its receiver. Such reconfigurations may occur when the device 12 obtains a measurement sample for a signal on a deactivated SCell.

In another embodiment, to minimize the impact of interruption on UL transmissions/measurements, a node may configure: UL transmission and/or UL measurement configuration adaptively, according to the SCell measurement cycle or depending on the possibility/capability to adapt the SCell measurement cycle; the SCell measurement cycle adaptively according to the UL transmission and/or UL measurement configuration or depending on the possibility/capability to adapt the UL transmission and/or UL measurement configuration; or may configure UL transmission and/or UL measurement configuration jointly with the SCell measurement cycle configuration. Such an adaptation may be performed by a measuring node, such as an LMU or eNodeB, by a node configuring the UL transmissions, such as a serving eNodeB, or by a positioning node or other node in the network 10 that requests or configures UL measurements made by a measuring node.

In one example, a network node such as an eNodeB configures UL transmissions for a given device 12, such as by configuring SRS transmissions by the device 12, to avoid or minimize the impact of interruptions on UL transmissions. This configuration in turn improves the performance of UL measurements for positioning because all or most of the UL signals are available at the measuring node for the UL positioning measurement. Examples of UL measurements are propagation delay, eNodeB Rx-Tx time difference, TA, timing measurements performed by an LMU, etc. Such adaptations can be realized by configuring the SCell measurement cycle and UL signal transmission such that they do not coincide in time or are at least apart by certain margin e.g. +/−1 frame. For example the periodicities of the SCell measurement cycle and SRS can be very different. In another example the starting time of the SCell measurement cycle and the SRS periodicity can be apart by at least certain margin e.g. +/−1 frame.

In this regard, the network node may adapt the UL configuration and/or the SCell measurement cycle configuration under one or more of the following conditions: an implicit indication, for example upon receiving an indication that UL measurements for positioning are configured or may be configured by a positioning node; upon receiving a request for UL transmission configuration for a device 12, which may be used for UL positioning; upon receiving an explicit indication such as upon receiving a request from another node, such as a positioning node or LMU, to configure UL transmissions at the device 12 so as to avoid or minimize interruptions on UL signals—here, the interruptions at issue are those that arise from receiver reconfigurations at the device 12, for example. A request may also specify the particular UL signals on which interruption should be minimized, e.g. SRS. The request may also indicate an acceptable level of target interruption.

Figure 5:
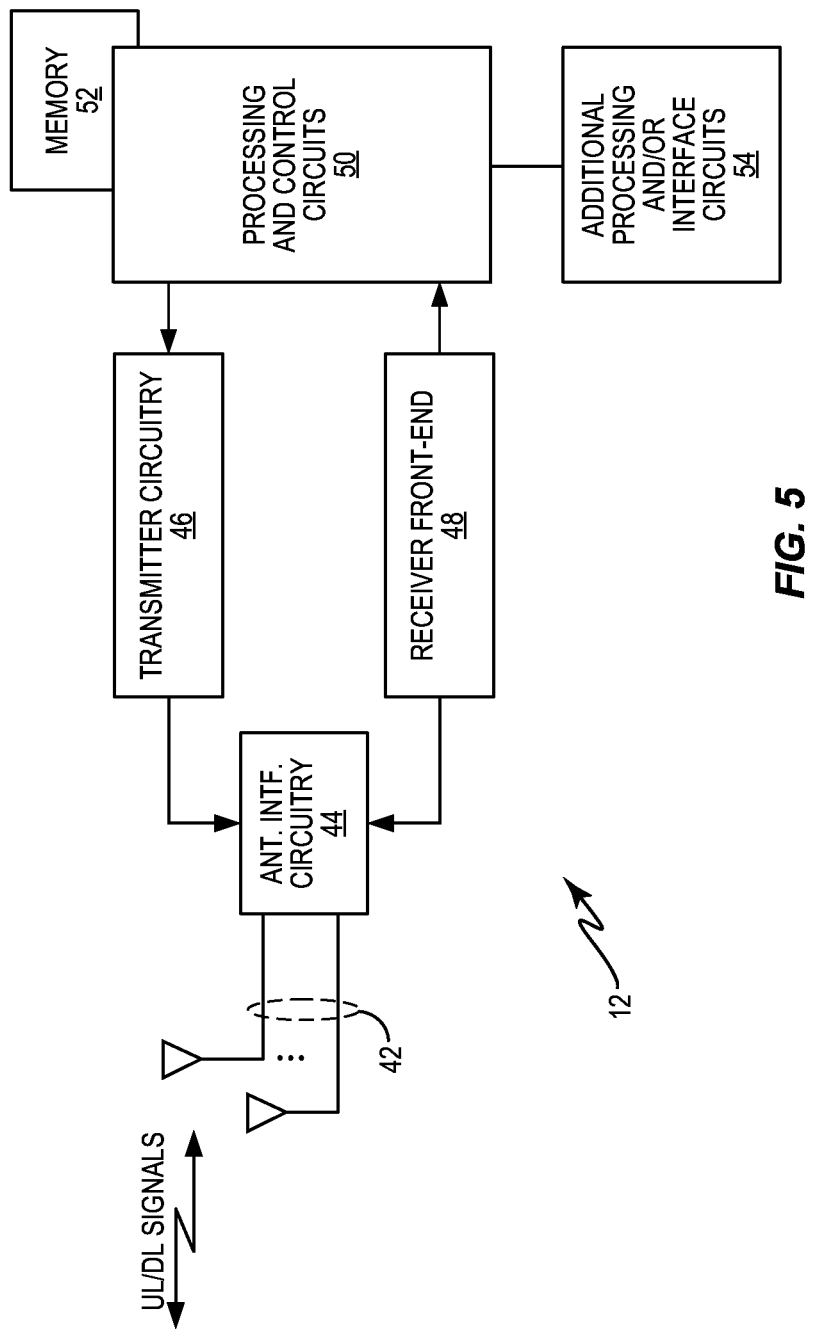
FIG. 5 is a block diagram of one embodiment of a wireless device, such as a 3GPP User Equipment or UE, which is configured according to the teachings herein.

With all of the above teachings in mind, FIG. 5 illustrates example implementation details for a wireless device, according to the teachings herein. The device 12 includes one or more receive/transmit antennas 42, antenna interface circuitry 44, transceiver circuitry that includes transmitter circuitry 46 and a receiver front-end 48, and processing and control circuits 50, which include or are associated with a memory 52. Depending on its features and intended use, the device 12 may include additional processing and/or interface circuits 54.

The device 12 is configured for CA operation, e.g., within the network 10, and its transceiver circuitry 46, 48 is configured to send signals to the network 10 and to receive signals from the network 10. The one or more processing circuits 50 are operatively associated with the transceiver circuitry 46, 48 and configured to receive a PRS configuration for configuring positioning measurements to be made by the device 12 with respect to at least one cell on an SCC, and to receive an SCell, measurement cycle configuration for configuring RRM measurements to be made by the device 12 on at least one cell on the SCC.

The one or more processing circuits 50 are configured to perform the positioning and RRM measurements according to the PRS and SCell measurement cycle configurations, respectively. Advantageously, as taught herein, such performance includes aligning the positioning and RRM measurements with respect to each other, to avoid exceeding a permitted level of interruption on the serving cell.

In some embodiments, the serving cell comprises the PCell of the device 12, on the PCC and in the same or other embodiments the device 12 is configured to operate with the PCC and the SCC according to a CA configuration, and the at least one cell on the SCC is a deactivated SCell on the SCC. In other embodiments, the at least one cell on the SCC comprises one of a deactivated SCell, or a neighbor cell of an SCell that is included in the CA configuration of the device 12.

In at least one example implementation, the one or more processing circuits 50 are configured to align the positioning measurements and RRM measurements to at least partially overlap in time, or to occur within a defined time of each other. Such alignment reduces or eliminates interruptions that would otherwise arise on the serving cell from the device 12 performing the PRS and RRM measurements. In at least one such embodiment, the device 12, via its one or more processing circuits 50, is configured to apply a time shift to the measurement cycle and/or to performing the positioning measurements, so that the positioning measurements overlap in time with, or occur closer in time to the RRM measurements. In another such embodiment, the one or more processing circuits 50 are configured to align the positioning and RRM measurements by aligning the positioning and RRM measurements according to one or more parameters in the received PRS and SCell measurement cycle configurations.

As noted at several earlier points in this disclosure, the permitted level of interruption may be defined as the probability of missed ACK/NACK at the wireless device 12, for packets transmitted on the serving cell. In a particular example of avoiding or limiting such interruptions, the processing circuits 50 are configured to align the positioning and RRM measurements to prevent any interruption on the serving cell arising from the positioning and RRM measurements, when there is a common DRX between the serving cell and the at least one cell on the SCC, or when there is no common DRX and a measurement cycle value specified in the SCell measurement cycle configuration is less than a defined duration. In at least one such embodiment, the one or more processing circuits 50 are further configured to align the positioning and RRM measurements to prevent more than a defined level of probability of missed ACK/NACK of packets transmitted on the serving cell, when there is no common DRX and when the measurement cycle value specified in the SCell measurement cycle configuration is greater than or equal to the defined duration.

Still further, in at least one embodiment, the device 12 is configured to prevent an interruption of the serving cell from exceeding an allowed interruption that is defined as a function of the corresponding interruptions caused by the RRM measurements and the positioning measurements. Here, the function is one of a minimum of the corresponding interruptions, a weighted or arithmetic average of the corresponding interruptions, or a maximum of the corresponding interruptions.

The processing circuit(s) 50 comprise, for example, fixed and/or programmed circuitry. In at least one example implementation, the processing circuit(s) 50 comprise one or more microprocessors, DSPs, FPGAs, or other digital processing circuitry. Further, in at least one such implementation, the processing circuit(s) are at least partly configured to perform the above-described operations based on their execution of computer program instructions in a computer program that is stored in the memory 52, or another computer-readable medium that is accessible to the one or more processing circuits 50.

Figure 6:
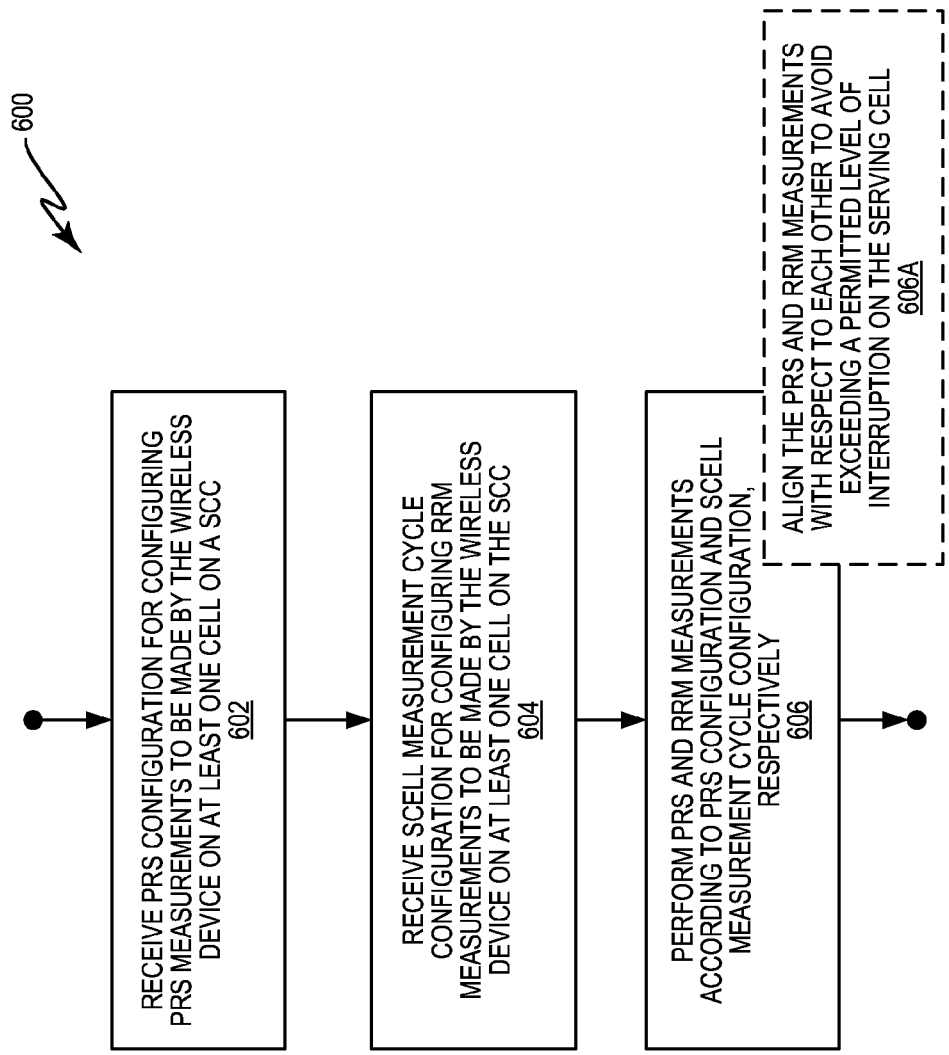
FIG. 6 is a logic flow diagram of one embodiment of a method of processing, as performed by the wireless device of FIG. 5, for example.

As such, it will be understood that the processing circuits 50 may be fixed or otherwise programmed to carry out a method 600, which is depicted in FIG. 6. Unless otherwise noted, one or more of the illustrated steps may be performed in a different order than that illustrated, or performed in parallel, and any or all such steps may be performed in conjunction with overall transmit/receive processing ongoing at the device 12.

The method 600 defines a method of performing measurements on one or more cells of a multi-carrier wireless communication network, e.g., the network 10, on at least one configured SCC. In the context of the method 600, the device 12 is configured for CA and served by at least one serving cell of the network 10.

The method 600 includes receiving (Block 602) a PRS configuration for configuring positioning measurements to be made by the device 12 with respect to at least one cell on the SCC, and receiving (Block 604) an SCell, measurement cycle configuration for configuring RRM measurements to be made by the device 12 on at least one cell on the SCC. Still further, the method 600 includes performing (Block 606) the positioning and RRM measurements according to the PRS and SCell measurement cycles configurations, respectively. Such performance includes aligning (Block 606A) the positioning and RRM measurements with respect to each other, to avoid exceeding a permitted level of interruption on the serving cell.

Figure 7:
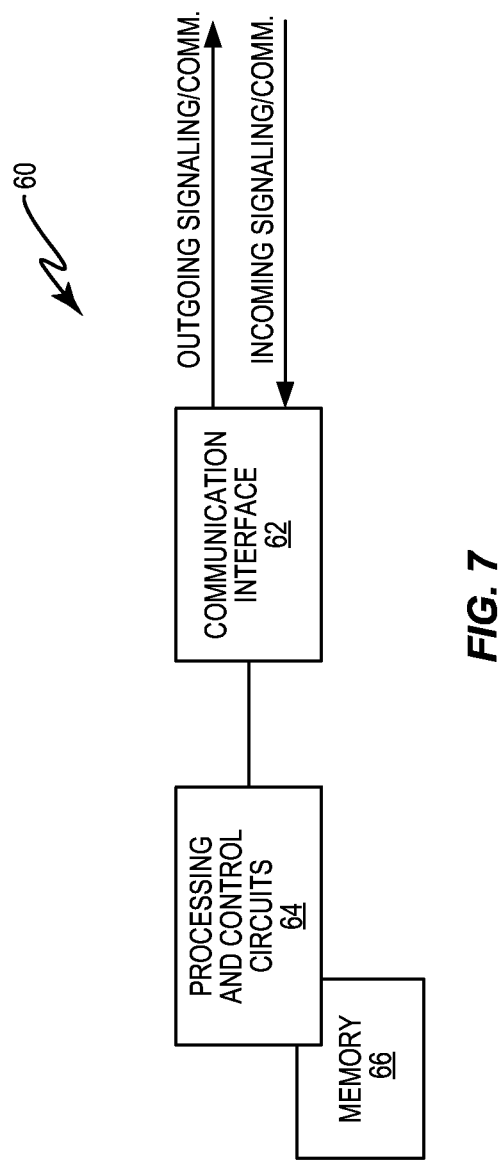
FIG. 7 is a block diagram of one embodiment of a network node, such as base station or positioning node, which is configured according to the teachings herein.

FIG. 7 illustrates an example network node 60. Here, the node 60 can be understood as representing any one or more of the network nodes discussed herein, e.g., a positioning node such as an E-SMLC 28 or SLP 30, or a base station 18, such as an eNodeB configured for operation in an E-UTRAN network. In that regard, the particular implementations of the depicted communication interface 62, processing and control circuits 64, and associated memory 66 will vary depending on the particulars of the node. For example, if the node 60 is an E-SMLC 28, the communication interface 62 will include support for LCS-AP, LPPa, and LMUp communications, such as depicted in FIGS. 3 and 4.

Further, the processing and control circuits 64 in one or more embodiments comprise one or more microprocessor-based circuits, DSP-based circuits, FPGA-based circuits, or other such digital processing circuitry, which may be fixed, or programmed/programmable circuitry. In at least one such embodiment, the processing and control circuits 64—hereafter the "one or more processing circuits 64" or "processing circuit(s) 64"—are configured at least in part based on their execution of computer program instructions included in a computer program stored in the memory 66 or in another computer-readable medium in or accessible to the processing and control circuits 64.

Broadly, the network node 60 is configured for operation in a multi-carrier wireless communication network, such as the network 10. The communication interface 62 is configured for at least one of: communicating with one or more other network nodes, e.g., any one or more of nodes 18, 28, 30 in FIGS. 3 and 4, in the network 10, and communicating with a wireless device 12 operating in the network 10 according to a CA configuration. The processing circuit(s) 64 are operatively associated with the communication interface 62 and configured to prevent more than a defined level of interruption on a serving cell of the device 12, based on being configured to determine an alignment needed between positioning measurements and RRM measurements to be made by the device 12 on at least one cell on a configured SCC, so as to avoid exceeding a permitted level of interruption on a serving cell of the device 12. Further, the processing circuit(s) 64 are configured to adapt at least one of an SCell measurement cycle configuration that controls the RRM measurements on the at least one cell on the SCC and a PRS configuration that controls the positioning measurements on the at least one cell on the SCC, based on the determined alignment, and to send the adapted configuration or configurations to at least one of the device 12 and a serving radio network node in the network 10. For example, the adaptations are sent to the serving base station 18 in the case that the node 60 is not the serving base station 18.

In at least one embodiment, the one or more processing circuit(s) 64 are configured to adapt one or more of an SCell measurement periodicity and starting time of an SCell measurement cycle, as defined by the SCell measurement cycle configuration. In the same or other embodiments, the processing circuit(s) 64 are configured to perform one or more of the following adaptations: set a periodicity of the SCell measurement cycle equal to a PRS measurement cycle; and align, at least within a defined range, a starting time of the SCell measurement cycle to a starting time of the PRS measurement cycle. The processing circuit(s) 64 in the same or another embodiment also may be configured to inform another network node of the adaptation(s).

As noted, the network node 60 may be a serving radio network node, e.g., a serving base station 18, and the one or more processing circuits 64 in such embodiments are configured to adapt the SCell measurement cycle configuration with respect to the PRS configuration. Alternatively, the network node 60 comprises a positioning node, e.g., an E-SMLC 28 or an SLP 30, that is in or associated with the network 10, and the one or more processing circuits 64 are configured to adapt the PRS configuration with respect to the SCell measurement cycle configuration. For example, in such an embodiment, the one or more processing circuits 64 are configured to adapt one or more of: the periodicity of PRS measurement occasions, the number of PRS subframes in the PRS occasions, and a muting pattern used for positioning measurements. In particular, the one or more processing circuits 64 may be configured to perform the adapting by setting the periodicity of the PRS occasions equal to the periodicity of an SCell measurement cycle, as defined by the SCell measurement cycle configuration.

Figure 8:
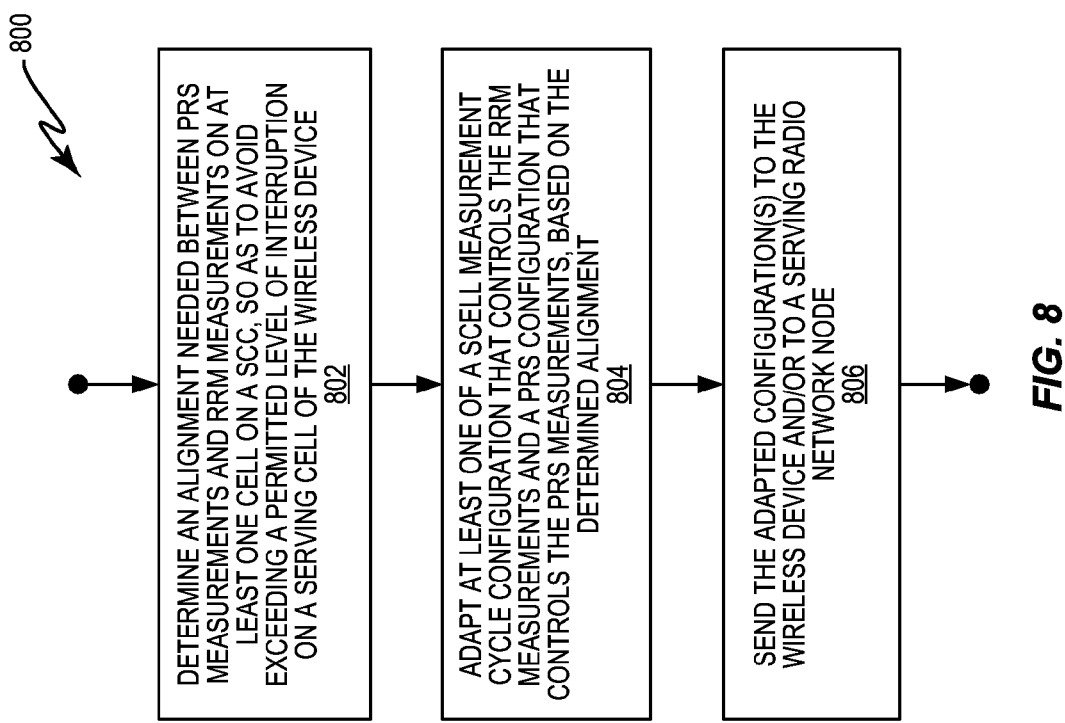
FIG. 8 is a logic flow diagram of one embodiment of a method of processing, as performed by the network node of FIG. 7, for example.

FIG. 8 illustrates a method 800, which is performed by the network node 60. As noted for the method 600, one or more processing steps may be performed in a different order, or together in parallel, and all such steps may be performed in conjunction with overall processing operations at the network node 60. In a particular example, the method 800 is performed by the processing circuit(s) 64 based at least in part on their execution of computer program instructions from a computer program stored in the memory 66 or stored in some other computer readable medium in or accessible to the processing circuit(s) 64.

The method 800, as performed by the network node 60 operating in a multi-carrier wireless communication network, prevents more than a permitted level of interruption on a serving cell of a wireless device 12 operating in the network according to a CA configuration. The method 800 includes determining (Block 802) an alignment needed between positioning measurements and RRM measurements to be made by the device 12 on at least one cell on a configured SCC, so as to avoid exceeding a permitted level of interruption on a serving cell of the device 12. The method 800 further includes adapting (Block 804) at least one of an SCell, measurement cycle configuration that controls the RRM measurements on the at least one cell on the SCC and a PRS configuration that controls the positioning measurements on the at least one cell on the SCC, based on the determined alignment, sending (Block 806) the adapted configuration or configurations to the device 12 and/or to a serving radio network node of the device 12.

The network node 60 additionally or alternatively may be configured to perform a method wherein it determines an UL transmission configuration for a wireless device 12 according to a configuration rule that, according to a defined probability, prevents or reduces UL transmission interruptions that arise from multi-carrier positioning and/or RRM measurements made by the device 12 with respect to a configured PCC and one or more SCC included in a CA configuration of the device 12. The method further includes adapting one or more UL transmission configuration settings according to the configuration rule and sending the adapted UL transmission configuration settings to the device 12, or to a serving radio network node of the device 12, for transfer to the device 12.

The same method may further include triggering invocation of the adapted UL transmission configuration in the device 12, based on detecting that a condition for triggering the configuration rule is met. Still further, the method may include sending the configuration rule and/or an indication of the one or more conditions to be met for invoking the configuration rule, e.g., to the device 12 and/or to its serving radio network node.

In a related but device-side embodiment, it is contemplated herein to configure a wireless device 12 to implement a method that includes detecting that a condition for invoking a configuration rule is met. The configuration rule, according to a defined probability, prevents or reduces UL transmission interruptions that arise from multi-carrier positioning and/or RRM measurements made by the device 12 with respect to a configured PCC and one or more SCCs included in a CA configuration of the device 12. The device method further includes adapting one or more measurement settings according to the configuration rule, where such measurement settings control the multi-carrier positioning and/or RRM measurements made by the device 12 on one or more cells on the SCC, and correspondingly performing the positioning and/or RRM measurements according to the adapted measurement settings. The device method further include detecting that the condition for invoking the rule is met based on receiving an indication from the network 10. The device method may further include receiving the configuration rule from the network 10.

With the above non-limiting examples in mind, the teaching presented in this disclosure include a method in a node— e.g., wireless device, radio node, positioning node, etc.—for use when multi-carrier operation is used. The method comprises adaptation of the SCell measurement cycle for the SCell RRM measurements in relation to the PRS configuration used for the SCell positioning measurement or vice versa. The adaption is performed to achieve an acceptable level of interruption of packets on at least the PCell, which may be expressed in terms of missed ACK/NACK probability. According to another aspect taught herein, a node performs control of interruption on UL measurements and/or UL transmissions, which may be transmitted/performed on any one or more of: a PCell as a serving cell or an SCell, if the UE is configured with CA.

For example, a method in an eNodeB or other radio network node comprises: adapting or adjusting the SCell measurement cycle configuration depending upon the PRS configuration on the same SCell, so as to enable the target device 12 to achieve a target PCell interruption rate when doing the measurements based on the SCell measurement cycle configuration and on the PRS configuration. Such operations may further include signaling the adapted SCell measurement cycle to the affected device 12, for adapting its SCell measurements accordingly.

In a further example, a method in a network node, such as a positioning node or base station, includes adapting or adjusting the PRS configuration for an SCell, e.g., adapting the PRS periodicity, with respect to the SCell measurement cycle for the same SCell, so as to enable the targeted device 12 to achieve a target PCell interruption rate when it performs measurements based on the SCell measurement cycle and the PRS configuration. The method in this further example may include signaling the adapted PRS configuration for the SCell to another node, e.g., to the device 12 for controlling its SCell positioning measurements, or to another node, such as the example case where an eNodeB signals an E-SMLC or another eNodeB.

In yet another example, a method in a device 12, which may be a 3GPP UE, includes receiving PRS configuration information or adapting a PRS configuration and either receiving or adapting an SCell measurement cycle configuration, and performing at least one SCell RRM measurement and one PRS positioning measurement while causing either no interruption or a pre-defined level of interruption of packets received on at least the PCell. Here, the permitted level of interruption on at least the PCell depends on the relation between the SCell measurement cycle configured for the SCell mobility measurements and the PRS configuration used on the same SCell for positioning measurements. The relation is determined by one or more of the following: periodicities of the SCell measurement cycle and the PRS configured on the SCell, the level of time alignment between the start of the SCell measurement cycle and the PRS occasion of the configured PRS, etc.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of performing measurements on one or more cells of a multi-carrier wireless communication network on at least one configured secondary component carrier, SCC, said method performed by a wireless device configured for carrier aggregation and served by at least one serving cell of the wireless communication network and comprising:
   receiving a Positioning Reference Signal, PRS, configuration for configuring positioning measurements to be made by the wireless device with respect to at least one cell on the SCC;
   receiving a Secondary Cell, SCell, measurement cycle configuration for configuring Radio Resource Management, RRM, measurements to be made by the wireless device on at least one cell on the SCC; and
   performing the positioning and RRM measurements according to the PRS and SCell measurement cycles configurations, respectively, including aligning the positioning and RRM measurements with respect to each other, to avoid exceeding a permitted level of interruption on the serving cell.

2. The method of claim 1, wherein the serving cell comprises a Primary Cell, PCell, on a Primary Component Carrier, PCC.

3. The method of claim 1, wherein the wireless device is configured with a Primary Component Carrier, PCC, and the SCC according to a carrier aggregation configuration, and wherein the SCell on the SCC is deactivated.

4. The method of claim 1, wherein the at least one cell on the SCC comprises one of a deactivated Secondary Cell, SCell, or a neighbor cell of an SCell that is included in a carrier aggregation configuration of the wireless device.

5. The method of claim 1, wherein aligning the positioning and RRM measurements comprises aligning the positioning measurements and RRM measurements to at least partially overlap in time, or to occur within a defined time of each other, thereby reducing or eliminating interruptions on the serving cell arising from the wireless device performing the positioning and RRM measurements.

6. The method of claim 5, wherein aligning the positioning and RRM measurements includes the wireless device applying a time shift to the measurement cycle and/or performing the positioning measurements, so that the positioning measurements overlap in time with, or occur closer in time to the RRM measurements.

7. The method of claim 1, wherein aligning the positioning and RRM measurements comprises aligning the positioning and RRM measurements according to one or more parameters in the received PRS and SCell measurement cycle configurations.

8. The method of claim 1, wherein the permitted level of interruption is defined as the probability of missed ACK/NACK of packets transmitted on the serving cell.

9. The method of claim 1, wherein aligning the positioning and RRM measurements comprises performing said step of aligning to prevent any interruption on the serving cell arising from the positioning and RRM measurements when there is a common Discontinuous Reception, DRX, between the serving cell and the at least one cell on the SCC, or when there is no common DRX and a measurement cycle value specified in the SCell measurement cycle configuration is less than a defined duration.

10. The method of claim 9, further comprising performing said step of aligning to prevent more than a defined level of probability of missed ACK/NACK of packets transmitted on the serving cell when there is no common DRX and when the measurement cycle value specified in the SCell measurement cycle configuration is greater than or equal to the defined duration.

11. The method of claim 1, where the wireless device is configured to prevent an interruption of the serving cell from exceeding an allowed interruption that is defined as a function of the corresponding interruptions caused by the RRM measurements and the positioning measurements, wherein said function is one of a minimum of the corresponding interruptions, a weighted or arithmetic average of the corresponding interruptions, or a maximum of the corresponding interruptions.

12. A wireless device configured for carrier aggregation operation in a multi-carrier wireless communication network, said wireless device comprising:
transceiver circuitry configured to send signals to the wireless communication network and to receive signals from the wireless communication network; and
one or more processing circuits operatively associated with the transceiver circuitry and configured to:
receive a Positioning Reference Signal, PRS, configuration for configuring positioning measurements to be made by the wireless device with respect to at least one cell on the SCC;
receive a Secondary Cell, SCell, measurement cycle configuration for configuring Radio Resource Management, RRM, measurements to be made by the wireless device on at least one cell on the SCC; and
perform the positioning and RRM measurements according to the PRS and SCell measurement cycle configurations, respectively, including aligning the positioning and RRM measurements with respect to each other, to avoid exceeding a permitted level of interruption on the serving cell.

13. The wireless device of claim 12, wherein the serving cell comprises a Primary Cell, PCell, on a Primary Component Carrier, PCC.

14. The wireless device of claim 12, wherein the wireless device is configured to operate with a Primary Component Carrier, PCC, and the SCC according to a carrier aggregation configuration, and wherein the SCell on the SCC is deactivated.

15. The wireless device of claim 12, wherein the at least one cell on the SCC comprises one of a deactivated Secondary Cell, SCell, or a neighbor cell of an SCell that is included in a carrier aggregation configuration of the wireless device.

16. The wireless device of claim 12, wherein the one or more processing circuits are configured to align the positioning measurements and RRM measurements to at least partially overlap in time, or to occur within a defined time of each other, thereby reducing or eliminating interruptions on the serving cell arising from the wireless device performing the PRS and RRM measurements.

17. The wireless device of claim 16, wherein, for aligning the positioning and RRM measurements, the one or more processing circuits are configured to apply a time shift to the measurement cycle and/or performing the positioning measurements, so that the positioning measurements overlap in time with, or occur closer in time to the RRM measurements.

18. The wireless device of claim 12, wherein the one or more processing circuits are configured to align the positioning and RRM measurements by aligning the positioning and RRM measurements according to one or more parameters in the received PRS and SCell measurement cycle configurations.

19. The wireless device of claim 12, wherein the permitted level of interruption is defined as the probability of missed ACK/NACK of packets transmitted on the serving cell.

20. The wireless device of claim 12, wherein the one or more processing circuits are configured to align the positioning and RRM measurements to prevent any interruption on the serving cell arising from the positioning and RRM measurements when there is a common Discontinuous Reception, DRX, between the serving cell and the at least one cell on the SCC, or when there is no common DRX and a measurement cycle value specified in the SCell measurement cycle configuration is less than a defined duration.

21. The wireless device of claim 20, wherein the one or more processing circuits are further configured to align the positioning and RRM measurements to prevent more than a defined level of probability of missed ACK/NACK of packets transmitted on the serving cell when there is no common DRX and when the measurement cycle value specified in the SCell measurement cycle configuration is greater than or equal to the defined duration.

22. The wireless device of claim 12, where the wireless device is configured to prevent an interruption of the serving cell from exceeding an allowed interruption that is defined as a function of the corresponding interruptions caused by the RRM measurements and the positioning measurements, wherein said function is one of a minimum of the corresponding interruptions, a weighted or arithmetic average of the corresponding interruptions, or a maximum of the corresponding interruptions.

23. A method in a network node in a multi-carrier wireless communication network of preventing more than a permitted level of interruption on a serving cell of a wireless device operating according to a carrier aggregation configuration, said method comprising:
determining an alignment needed between positioning measurements and Radio Resource Management, RRM, measurements to be made by the wireless device on at least one cell on a configured Secondary Component Carrier, SCC, so as to avoid exceeding a permitted level of interruption on a serving cell of the wireless device;
adapting at least one of a Secondary Cell, SCell, measurement cycle configuration that controls the RRM measurements on the at least one cell on the SCC and a PRS configuration that controls the positioning measurements on the at least one cell on the SCC, based on the determined alignment; and sending the adapted configuration or configurations to at least one of the wireless device and a serving radio network node of the wireless device.

24. The method of claim 23, wherein said step of adapting comprises adapting one or more of an SCell measurement periodicity and starting time of an SCell measurement cycle, as defined by the SCell measurement cycle configuration.

25. The method of claim 23, wherein said step of adapting comprises one or more of the following adaptations:
setting a periodicity of the SCell measurement cycle equal to a PRS measurement cycle; and
aligning, at least within a defined range, a starting time of the SCell measurement cycle to a starting time of the PRS measurement cycle.

26. The method of claim 23, further comprising informing another network node of said adapting.

27. The method of claim 23, wherein said network node comprises the serving radio network node, and wherein said adapting comprises the serving radio network node adapting the SCell measurement cycle configuration with respect to the PRS configuration.

28. The method of claim 23, wherein said network node comprises a positioning node in or associated with the wireless communication network, and wherein said adapting comprises the positioning node adapting the PRS configuration with respect to the SCell measurement cycle configuration.

29. The method of claim 28, wherein said adapting comprises adapting one or more of:
the periodicity of PRS measurement occasions, the number of PRS subframes in the PRS occasions, and a muting pattern used for positioning measurements.

30. The method of claim 28, wherein said adapting comprises setting the periodicity of the PRS occasions equal to the periodicity of an SCell measurement cycle, as defined by the SCell measurement cycle configuration.

31. The method of claim 23, wherein the serving cell comprises at least a Primary Cell, PCell, on a Primary Component Carrier, PCC and additionally a Secondary Cell (SCell) on the SCC and wherein the SCell is deactivated.

32. The method of claim 23, wherein the permitted level of interruption is defined as the probability of missed ACK/NACK of packets transmitted on the serving cell.

33. A network node configured for operation in a multi-carrier wireless communication network and comprising:
a communication interface configured for at least one of:
communicating with one or more other network nodes in the wireless communication network, and communicating with a wireless device operating in the wireless communication network according to a carrier aggregation configuration; and
one or more processing circuits operatively associated with the communication interface and configured to prevent more than a defined level of interruption on a serving cell of the wireless device, based on said one or more processing circuits being configured to:
determine an alignment needed between positioning measurements and Radio Resource Management, RRM, measurements to be made by the wireless device on at least one cell on a configured Secondary Component Carrier, SCC, so as to avoid exceeding a permitted level of interruption on a serving cell of the wireless device;
adapt at least one of a Secondary Cell, SCell, measurement cycle configuration that controls the RRM measurements on the at least one cell on the SCC and a PRS configuration that controls the positioning measurements on the at least one cell on the SCC, based on the determined alignment; and
send the adapted configuration or configurations to at least one of the wireless device and a serving radio network node in the wireless communication network.

34. The network node of claim 33, wherein the one or more processing circuits are configured to adapt one or more of an SCell measurement periodicity and starting time of an SCell measurement cycle, as defined by the SCell measurement cycle configuration.

35. The network node of claim 33, wherein the one or more processing circuits are configured to perform one or more of the following adaptations:
set a periodicity of the SCell measurement cycle equal to a PRS measurement cycle; and
align, at least within a defined range, a starting time of the SCell measurement cycle to a starting time of the PRS measurement cycle.

36. The network node of claim 33, wherein the one or more processing circuits are configured to inform another network node of said adapting.

37. The network node of claim 33, wherein said network node comprises the serving radio network node, and wherein the one or more processing circuits are configured to adapt the SCell measurement cycle configuration with respect to the PRS configuration.

38. The network node of claim 33, wherein said network node comprises a positioning node in or associated with the wireless communication network, and wherein the one or more processing circuits are configured to adapt the PRS configuration with respect to the SCell measurement cycle configuration.

39. The network node of claim 38, wherein the one or more processing circuits are configured to adapt one or more of: the periodicity of PRS measurement occasions, the number of PRS subframes in the PRS occasions, and a muting pattern used for positioning measurements.

40. The network node of claim 38, wherein the one or more processing circuits are configured to perform said adapting by setting the periodicity of the PRS occasions equal to the periodicity of an SCell measurement cycle, as defined by the SCell measurement cycle configuration.

* * * * *